(12) United States Patent
Choi

(10) Patent No.: US 10,051,161 B2
(45) Date of Patent: Aug. 14, 2018

(54) ELECTRONIC DEVICE WITH ZOOM LENS

(71) Applicant: Samsung Electronics Co., Ltd., Gyeonggi-do (KR)

(72) Inventor: Jongmin Choi, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/684,279

(22) Filed: Apr. 10, 2015

(65) Prior Publication Data
US 2015/0304569 A1    Oct. 22, 2015

(30) Foreign Application Priority Data

Apr. 18, 2014  (KR) .................. 10-2014-0046672
Nov. 19, 2014  (KR) .................. 10-2014-0161437

(51) Int. Cl.
| | | |
|---|---|---|
| H04N 5/232 | (2006.01) | |
| H04N 5/225 | (2006.01) | |
| H04M 1/02 | (2006.01) | |
| G02B 13/00 | (2006.01) | |
| G02B 7/10 | (2006.01) | |

(52) U.S. Cl.
CPC ......... *H04N 5/2251* (2013.01); *G02B 13/009* (2013.01); *H04M 1/0262* (2013.01); *H04M 1/0264* (2013.01); *H04N 5/2256* (2013.01); *H04N 5/2257* (2013.01); *H04N 5/23216* (2013.01); *H04N 5/23293* (2013.01); *H04N 5/23296* (2013.01); *G02B 7/102* (2013.01); *H04M 2001/0204* (2013.01); *H04N 5/2252* (2013.01); *H04N 5/2254* (2013.01)

(58) Field of Classification Search
None
See application file for complete search history.

(56) References Cited

U.S. PATENT DOCUMENTS

| | | | | |
|---|---|---|---|---|
| D689,109 S | * | 9/2013 | Kim .......................... | D16/202 |
| D720,338 S | * | 12/2014 | Nousiainen ................ | D14/248 |
| D726,801 S | * | 4/2015 | Kim .......................... | D16/219 |
| D733,109 S | * | 6/2015 | Reivo ........................ | D14/248 |
| D735,703 S | * | 8/2015 | Reivo ........................ | D14/248 |

(Continued)

FOREIGN PATENT DOCUMENTS

| | | |
|---|---|---|
| JP | 2013-081256 | 5/2013 |
| WO | WO 2010/134275 A1 | 11/2010 |

OTHER PUBLICATIONS

Samsung Introduces the Galaxy K zoom, a New Camera Specialized-Smartphone | Samsung Mobile Press. (n.d.). Retrieved Apr. 29, 2016, from http://www.samsungmobilepress.com/2014/04/29/samsung-introduces-the-galaxy-k-zoom,-a-new-camera-specialized-smartphone-1.*

(Continued)

*Primary Examiner* — Justin P. Misleh

(57) ABSTRACT

Disclosed is an electronic device having a display unit exposed on a front surface and a lens module disposed on a rear surface. The electronic device includes: a motor unit positioned at one side of the lens module and configured to provide a driving force to the lens module; and a side key positioned at the other side of the lens module which is opposite to the one side of the lens module, the side key being positioned on any one of side end parts of the electronic device. The lens module may be positioned between the side key and the motor unit.

16 Claims, 19 Drawing Sheets

(56) References Cited

U.S. PATENT DOCUMENTS

| | | | |
|---|---|---|---|
| D741,930 S * | 10/2015 | Kwon | D16/202 |
| 2004/0165106 A1 | 8/2004 | Nakagawa | |
| 2004/0266477 A1 | 12/2004 | Murata | |
| 2005/0057685 A1* | 3/2005 | Yamaguchi | H04N 5/2252 |
| | | | 348/375 |
| 2009/0085812 A1* | 4/2009 | Qi | H01Q 1/243 |
| | | | 343/702 |
| 2010/0195303 A1* | 8/2010 | Ishikawa | G03B 17/00 |
| | | | 361/790 |
| 2011/0019058 A1* | 1/2011 | Sakai | G06F 3/04847 |
| | | | 348/333.01 |
| 2011/0109581 A1 | 5/2011 | Ozawa et al. | |
| 2011/0194009 A1* | 8/2011 | Park | H04N 5/2253 |
| | | | 348/333.01 |
| 2012/0093494 A1* | 4/2012 | Wang | H04M 1/0264 |
| | | | 396/72 |
| 2012/0313827 A1* | 12/2012 | Kim | H01Q 1/243 |
| | | | 343/702 |
| 2012/0314351 A1* | 12/2012 | Kroupa | B65H 75/4434 |
| | | | 361/679.01 |
| 2012/0314355 A1* | 12/2012 | Miyamatsu | H01M 2/1066 |
| | | | 361/679.01 |
| 2015/0092282 A1* | 4/2015 | Niiyama | G02B 7/09 |
| | | | 359/700 |
| 2015/0109170 A1* | 4/2015 | Kang | G06F 1/182 |
| | | | 343/702 |

OTHER PUBLICATIONS

[Infographic] Capture the moment with the Galaxy K zoom. (n.d.). Retrieved Apr. 29, 2016, from https://news.samsung.com/global/infographic-capture-the-moment-with-the-galaxy-k-zoom.*

Nokia Lumia 1020 Service Manual (n.d.). Retrieved Apr. 29, 2016, from http://wpleaks.com/wp-content/uploads/Nokia-Lumia-1020-Service-Manual.pdf.*

Lumia 1020 camera grip review. (2013). Retrieved Apr. 29, 2016, from http://www.wpxbox.com/lumia-1020-camera-grip-review/.*

P., & Aguilar, M. (2013). Nokia 1020 Review: The Best Smartphone Camera in a Pretty Great Phone. Retrieved Apr. 29, 2016, from http://gizmodo.com/nokia-1020-review-at-last-a-terrific-camera-in-a-great-886123042.*

Extended European Search report, dated Jun. 9, 2015, in connection with European Patent Application No. 15162934.2, 5 pages.

* cited by examiner

ELECTRONIC DEVICE WITH ZOOM LENS

The present application is related to and claims priority under 35 U.S.C. § 119(a) to Korean Application Serial Nos. 10-2014-0046672 and 10-2014-0161437, which were filed in the Korean Intellectual Property Office on Apr. 18, 2014 and Nov. 19, 2014, the entire content of which is hereby incorporated by reference.

TECHNICAL FIELD

Various embodiments of the present disclosure relate to an internal mounting structure of an electronic device including a zoom lens, and more particularly to an electronic device that improves a user's usability and portability through an inner mounting structure and an external shape of the electronic device, in which the zoom of a lens can be operated through a simple touch action.

BACKGROUND

An electronic device may execute various functions compositely. For example, portable terminals, such as a smart phone, have been developed to provide a lot of convenience to users while implementing improved performances. Various configurations can be added to portable terminals in order to strengthen multimedia functions. For example, a zoom lens can be added to an electronic device so as to strengthen the camera function of the electronic device.

In addition, portable terminals have been developed to reduce the thickness and weight thereof in order for the portability thereof.

SUMMARY

A portable terminal is additionally equipped with a zoom lens in order to strengthen, for example, a multimedia function thereof. The zoom lens module implements an optical system having various focus distances by adjusting intervals in a lens group using a zoom lens barrel assembly. When the zoom lens barrel assembly is used, the optical system of the camera is converted into a wide-angle lens or a telescopic lens. Thus, the user can take pictures with various viewing angles in a place without moving.

In order to adjust an inter-lens interval in the lens group, it is necessary to change a relative position of the barrel that supports the lens group. For example, a multi-stage zoom lens barrel assembly employing a plurality of relatively movable barrels is used in order to implement multi-magnification zoom. However, the multi-stage barrel assembly has a problem in that the number of components is increased and the size of the zoom lens is also increased.

Recently, a high performance zoom function has also been requested even in portable terminals. Thus, the zoom lens barrel assembly should implement a high performance zoom function even though it is thin. However, even if the zoom lens barrel assembly is configured to be very thin, it is difficult to minimize the thickness of the electronic device in a state where the zoom lens barrel assembly is accommodated in the electronic device.

In order to improve the portability, efforts are continuously made to reduce the thickness and weight of portable terminals. In particular, according to the slimming trends of the portable terminals, distribution of portable terminals having a thickness of 10 mm or less has been practically generalized.

When a bulky high performance zoom lens is mounted on a portable terminal, the portability and usability of the portable terminal deteriorates.

For example, a zoom lens-equipped camera includes a protruding portion, called grip, so as to allow a user to easily grip the camera. A mounting space for large components, such as an antenna and a condenser, is secured using the internal space of the grip.

However, the protruding hand grip and zoom lens are components that are improper for a portable terminal in which the portability and usability are emphasized. In particular, in a state in which the user grips the portable terminal by one hand, the user's inconvenience is caused when operating the touch panel of the display unit by the other hand or watching an image displayed on the display unit. To address the above-discussed deficiencies, it is a primary object to provide an electronic device or a terminal that secures the portability and usability of the electronic device, even though a high performance zoom lens having a communication function is equipped therein.

In addition, an electronic device according to various embodiments of the present disclosure provides a structure that allows components of the electronic device to be optimally mounted without a grip shape on the electronic device.

Further, an electronic device according to various embodiments of the present disclosure is configured such that a touch panel senses a zoom-in/out input, and when the zoom-in/out input is sensed, the zoom of a lens module is performed.

An electronic device according to various embodiments of the present disclosure includes a display unit disposed on a front surface and a lens module disposed on a rear surface. The electronic device is a portable terminal having a communication function and a camera function.

The electronic device further includes a motor unit and a side key.

The motor unit is positioned at one side of the lens module. The motor unit is configured to provide a driving force to the lens module.

The side key is positioned at the other side of the lens module which is opposite to the one side of the lens module. The side key is positioned on any one of side end parts of the electronic device.

The lens module is positioned between the side key and the motor unit. The lens module and the motor unit are disposed on the rear surface of the front case.

When the front case is divided into two widthwise regions, the motor unit is positioned one widthwise region of the front case. The motor unit is configured to transmit the driving force to the lens driving unit positioned at the one side of the lens module.

A first widthwise region is a region bordered by a first side end part of the front case that is one of two side end parts of the front case that are opposite to each other in a widthwise direction.

The side key is positioned on the second side end part that is opposite to the first side end part of the both widthwise side end parts of the front case.

The lens module includes a zoom lens. When the front case is divided into two longitudinal regions, the lens module is positioned in a first longitudinal region.

A driving shaft of the motor unit is positioned to extend from the motor unit in a direction approaching the lens module in the longitudinal direction of the electronic device.

The driving shaft is configured to transmit the driving force to the lens driving unit positioned at the one side of the lens module.

The electronic device further includes a main board mounted on the rear surface of the front case.

The lens module and the motor unit are installed to penetrate the main board.

The main board is a printed circuit board that is electrically connected with the side key, the lens module, and the motor unit.

The electronic device further includes a flash positioned on the rear surface of the front case.

The flash is positioned on the second widthwise region, which is a region bordered by the second side end part of the both widthwise lateral parts, in which the second widthwise region is opposite to the first widthwise region.

The light emitting part of the flash is formed to extend in the longitudinal direction of the electronic device to face a direction away from the rear surface of the electronic device.

The electronic device further includes a storage battery provided in the second widthwise region of the both widthwise regions.

The storage battery is disposed between the side key and the lens module to extend in the longitudinal direction of the electronic device to be connected with the flash. The storage battery is positioned on the rear surface of the main board, in which the rear surface is a region opposite to the front surface of the main board which is in contact with the front case. The storage battery is electrically connected with the main board.

The electronic device further includes a rear case assembled with the front case. The rear case is disposed such that the main board is positioned between the front case and the rear case. The rear case further includes: a lens hole, through which the lens module is inserted to prevent separation of the lens module; the battery mounting part positioned in a lower region of the rear case; and a flash hole, through which the light emitting part of the flash is inserted.

The battery mounting part is positioned in a second longitudinal region opposite to the first longitudinal region of the two longitudinal regions of the front case so that the lens driving unit is positioned between the battery mounting part and the motor unit.

The electronic device further includes a battery cover detachable from, and attachable to, the rear case in a popup manner.

The battery cover attached to the rear case further includes: a lens hole, through which the lens module protrudes; and a flash hole in which the light emitting part of the flash is positioned.

The outer surface of the battery cover may have a curved shape in a region ranging from the first side end part to the second side end part.

A central portion between the first side end part and the second side end part on the outer surface of the battery cover may bulge out as compared to the first side end part and the second side end part.

A step is formed between the lens module and the battery cover, and the step may decrease from the central portion towards the first side end part and the second side end part.

A speaker is positioned between a top end part of the electronic device and the lens module.

The battery cover further includes a speaker hole at a position corresponding to the speaker.

A phone receiver is positioned between the speaker and the front surface of the front case.

The electronic device further includes: a touch screen panel configured to sense a zoom-in or zoom-out input at one or more points; and a control unit configured to determine whether the touch screen panel senses the zoom-in or zoom-out input in succession for a pre-set length of time at the one or more points.

Zoom of the lens module is driven in response to the zoom-in or zoom-out input.

The display unit can display a live view generated by an image sensor unit.

In a picture photographing mode, when a touch release event is sensed after the zoom-in or zoom-out input is sensed, the electronic device can photograph a still image.

The zoom-in or zoom-out input and the zoom of the lens module can be proportional to each other within a pre-set range.

According to an electronic device of various embodiments of the present disclosure, it is possible to reduce a user's inconvenience caused by a lens module and a grip portion, even though a communication function is incorporated in the electronic device and a high performance zoom lens is mounted in the electronic device. That is, the lens performance, portability, and Usability of the electronic device can be enhanced at once. In addition, the zoom of the lens module desired by the user is obtained by performing a pinch-in, or pinch out, input on the touch screen.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
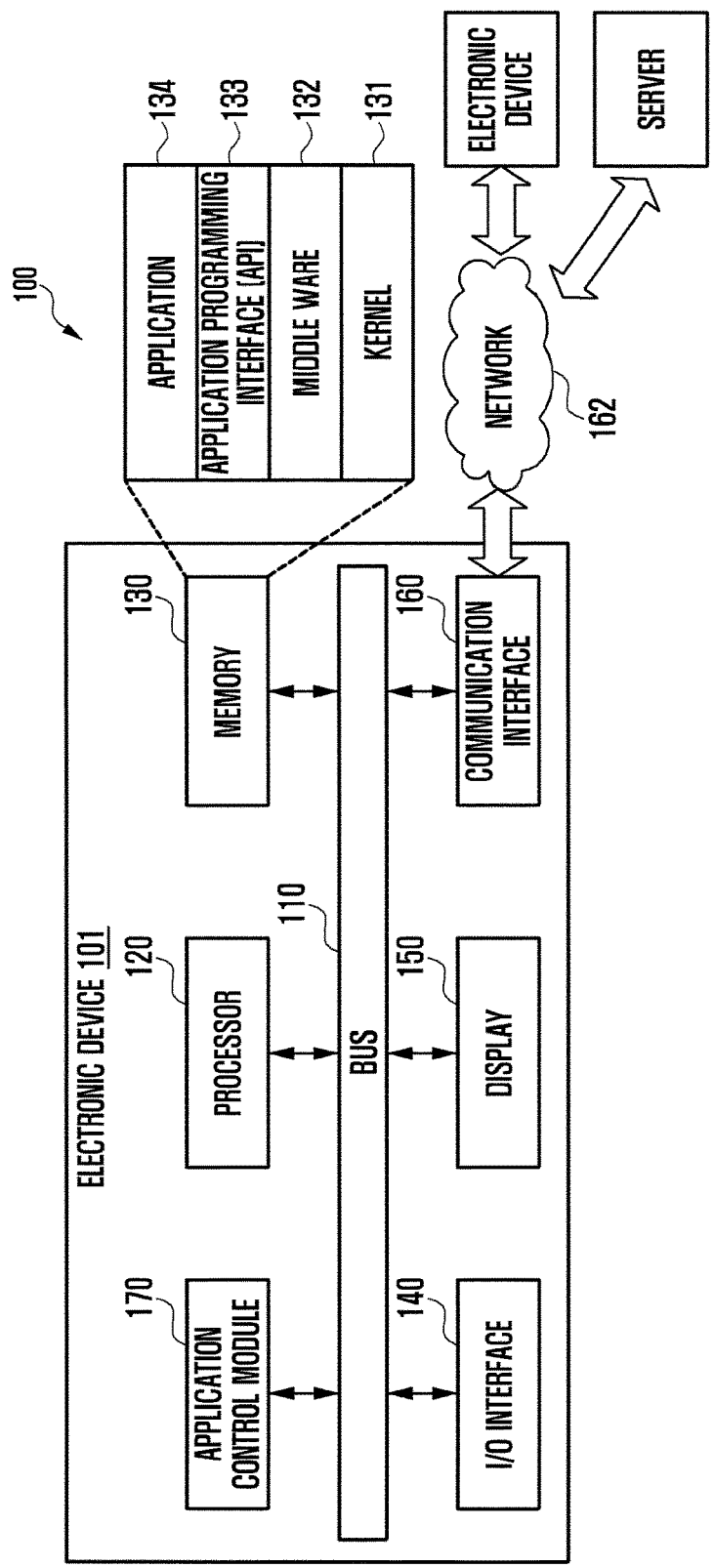
FIG. 1 illustrates a network environment including an electronic device according to various embodiments of the present disclosure.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electric device or system. Hereinafter, the present disclosure will be described with reference to the accompanying drawings. Although specific embodiments are illustrated in the drawings and related detailed descriptions are discussed in the present specification, the present disclosure may have various modifications and several embodiments. However, various embodiments of the present disclosure are not limited to a specific implementation form and it should be understood that the present disclosure includes all changes and/or equivalents and substitutes included in the spirit and scope of various embodiments of the present disclosure. In connection with descriptions of the drawings, similar components are designated by the same reference numeral.

The term "include" or "may include" or "can include" that may be used in describing various embodiments of the present disclosure refers to the existence of a corresponding disclosed function, operation or component which can be used in various embodiments of the present disclosure and does not limit one or more additional functions, operations, or components. In various embodiments of the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments of the present disclosure, the expression "or" or "at least one of A or/and B" includes any or all of combinations of words listed together. For example, the expression "A or B", "at least A and B", or "at least A or/and B" may include A, may include B, or can include both A and B.

The expression "1", "2", "first", or "second" used in various embodiments of the present disclosure may modify various components of the various embodiments but does not limit the corresponding components. For example, the above expressions do not limit the sequence and/or importance of the components. The expressions may be used for distinguishing one component from other components. For example, a first user device and a second user device indicate different user devices although both of them are user devices. For example, without departing from the scope of the present disclosure, a first structural element may be referred to as a second structural element. Similarly, the second structural element also may be referred to as the first structural element.

When it is stated that a component is "coupled to" or "connected to" another component, the component can be directly coupled or connected to another component or a new component may exist between the component and another component. In contrast, when it is stated that a component is "directly coupled to" or "directly connected to" another component, a new component does not exist between the component and another component.

The terms used in describing various embodiments of the present disclosure are only examples for describing a specific embodiment but do not limit the various embodiments of the present disclosure. Singular forms are intended to include plural forms unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present description.

An electronic device according to various embodiments of the present disclosure is a device including a communication function. For example, the electronic device can be one or a combination of a smart phone, a tablet Personal Computer (PC), a mobile phone, a video phone, an e-book reader, a desktop PC, a laptop PC, a netbook computer, a Personal Digital Assistant (PDA), a camera, a wearable device (for example, a Head-Mounted-Device (HMD) such as electronic glasses, electronic clothes, and electronic bracelet, an electronic necklace, an electronic appcessary, an electronic tattoo, and a smart watch.

According to some embodiments, the electronic device can be a smart home appliance having a communication function. The smart home appliance includes at least one of a TeleVision (TV), a Digital Video Disk (DVD) player, an audio player, an air conditioner, a cleaner, an oven, a microwave oven, a washing machine, an air cleaner, a set-top box, a TV box (for example, SAMSUNG HOMESYNC™, APPLE TV®, or GOOGLE TV®), game consoles, an electronic dictionary, an electronic key, a camcorder, and an electronic frame.

According to some embodiments, the electronic device includes at least one of various types of medical devices (for example, Magnetic Resonance Angiography (MRA), Magnetic Resonance Imaging (MRI), Computed Tomography (CT), a scanner, an ultrasonic device and the like), a navigation device, a Global Positioning System (GPS) receiver, an Event Data Recorder (EDR), a Flight Data Recorder (FDR), a vehicle infotainment device, electronic equipment for a ship (for example, a navigation device for ship, a gyro compass and the like), avionics, a security device, a head unit for a vehicle, an industrial or home robot, an Automatic Teller Machine (ATM) of financial institutions, and a Point Of Sale (POS) device of shops.

According to some embodiments, the electronic device includes at least one of furniture or a part of a building or structure, an electronic board, an electronic signature receiving device, a projector, and various types of measuring devices (for example, a water meter, an electricity meter, a gas meter, a radio wave meter and the like) including a camera function. The electronic device according to various embodiments of the present disclosure is one or a combination of the above described various devices. Further, the electronic device according to various embodiments of the present disclosure is a flexible device. It is apparent to those skilled in the art that the electronic device according to various embodiments of the present disclosure is not limited to the above described devices.

Hereinafter, an electronic device according to various embodiments of the present disclosure will be described with reference to the accompanying drawings. The term "user" used in various embodiments may refer to a person who uses an electronic device or a device (for example, an artificial intelligence electronic device) that uses an electronic device.

FIG. 1 illustrates a network environment 100 including an electronic device 101 according to various embodiments of the present disclosure. Referring to FIG. 1, the electronic device 101 includes a bus 110, a processor 120, a memory 130, an input/output interface 140, a display 150, a communication interface 160, and a communication control module 170.

The bus 110 is a circuit that connects the above described components and transmits communication (for example, a control message) between the above described components.

The processor 120 receives commands from other components (for example, the memory 130, the input/output interface 140, the display 150, the communication interface 160, or the communication control module 170) through the bus 110, analyzes the received commands, and executes calculation or data processing according to the analyzed commands.

The memory 130 stores commands or data received from the processor 120 or other components (for example, the input/output interface 140, the display 150, the communication interface 160, or the communication control module 170) or generated by the processor 120 or other components. The memory 130 includes programming modules, for example, a kernel 131, middleware 132, an Application Programming Interface (API) 133, and an application 134. Each of the aforementioned programming modules can be implemented by software, firmware, hardware, or a combination of two or more thereof.

The kernel 131 controls or manages system resources (for example, the bus 110, the processor 120, or the memory 130) used for executing an operation or function implemented by the remaining other programming modules, for example, the middleware 132, the API 133, or the application 134. Further, the kernel 131 provides an interface for accessing individual components of the electronic device 101 from the middleware 132, the API 133, or the application 134 to control or manage the components.

The middleware 132 performs a relay function of allowing the API 133 or the application 134 to communicate with the kernel 131 to exchange data. Further, in operation requests received from the application 134, the middleware 132 performs a control for the operation requests (for example, scheduling or load balancing) by using a method of assigning a priority, by which system resources (for example, the bus 110, the processor 120, the memory 130 and the like) of the electronic device 101 can be used, to the application 134.

The API 133 is an interface by which the application 134 can control a function provided by the kernel 131 or the middleware 132 and includes, for example, at least one interface or function (for example, command) for a file control, a window control, image processing, or a character control.

According to various embodiments, the application 134 includes a Short Message Service (SMS)/Multimedia Messaging Service (MMS) application, an email application, a calendar application, an alarm application, a health care application (for example, application measuring quantity of exercise or blood sugar) or an environment information application (for example, application providing information on barometric pressure, humidity or temperature). Additionally or alternatively, the application 134 can be an application related to an information exchange between the electronic device 101 and an external electronic device (for example, electronic device 104). The application related to the information exchange includes, for example, a notification relay application for transferring particular information to the external electronic device or a device management application for managing the external electronic device.

For example, the notification relay application includes a function of transmitting notification information generated by another application (for example, an SMS/MMS application, an email application, a health care application or an environment information application) of the electronic device 101 to the external electronic device (for example, electronic device 104). Additionally or alternatively, the notification relay application receives notification information from, for example, the external electronic device 104 and provides the received notification information to the user. The device management application manages (for example, install, remove, or update) at least a part of functions (for example, turning on/off the external electronic device (or some components of the external electronic device) or controlling a brightness of the display) of the external electronic device (104 communicating with the electronic device 101, an application executed in the external electronic device 104, or a service (for example, call service or message service) provided by the external electronic device 104.

According to various embodiments, the application 134 includes an application designated according to an attribute (for example, type of electronic device) of the external electronic device 104. For example, when the external electronic device 104 is an MP3 player, the application 134 includes an application related to music reproduction. Similarly, when the external electronic device 104 is a mobile medical device, the application 134 includes an application related to health care. According to an embodiment, the application 134 includes at least one of an application designated to the electronic device 101 and an application received from an external electronic device (for example, server 106 or electronic device 104).

The input/output interface 140 transmits a command or data input from the user through an input/output device (for example, a sensor, a keyboard, or a touch screen) to the processor 120, the memory 130, the communication interface 160, or the display control module 170 through, for example, the bus 110. For example, the input/output interface 140 can provide data on a user's touch input through a touch screen to the processor 120. Further, the input/output interface 140 can output a command or data received, through, for example, the bus 110, from the processor 120, the memory 130, the communication interface 160, or the communication control module 170 through the input/output device (for example, a speaker or a display). For example, the input/output interface 140 can output voice data processed through the processor 120 to the user through the speaker.

The display 150 displays various pieces of information (for example, multimedia data, text data, or the like) for the user.

The communication interface 160 connects communication between the electronic device 101 and the external device (for example, electronic device 104 or server 106). For example, the communication interface 160 can access a network 162 through wireless or wired communication to communicate with the external device. The wireless communication includes at least one of, for example, WiFi, BLUETOOTH® (BT), Near Field Communication (NFC), a Global Positioning System (GPS), or cellular communication (for example, LTE, LTE-A, CDMA, WCDMA, UMTS, WiBro or GSM). The wired communication includes at least one of, for example, a Universal Serial Bus (USB), a High Definition Multimedia Interface (HDMI), Recommended Standard 232 (RS-232), or a Plain Old Telephone Service (POTS).

According to an embodiment, the network 162 is a telecommunication network. The telecommunication network includes at least one of a computer network, Internet, Internet of things, or a telephone network. According to an embodiment, a protocol (for example, transport layer protocol, data link layer protocol, or physical layer protocol) for communication between the electronic device 101 and the external device is supported by at least one of the application 134, the application programming interface 133, the middleware 132, the kernel 131, or the communication interface 160.

According to an embodiment, the server 106 supports driving of the electronic device 101 by performing at least one operation (or function) implemented by the electronic device 101. For example, the server 106 includes a communication control server module 108 that supports the communication control module 170 implemented in the electronic device 101. For example, the communication control server module 108 includes at least one of the components of the communication control module 170 to perform (on behalf of) at least one operations performed by the communication control module 170.

Figure 2:
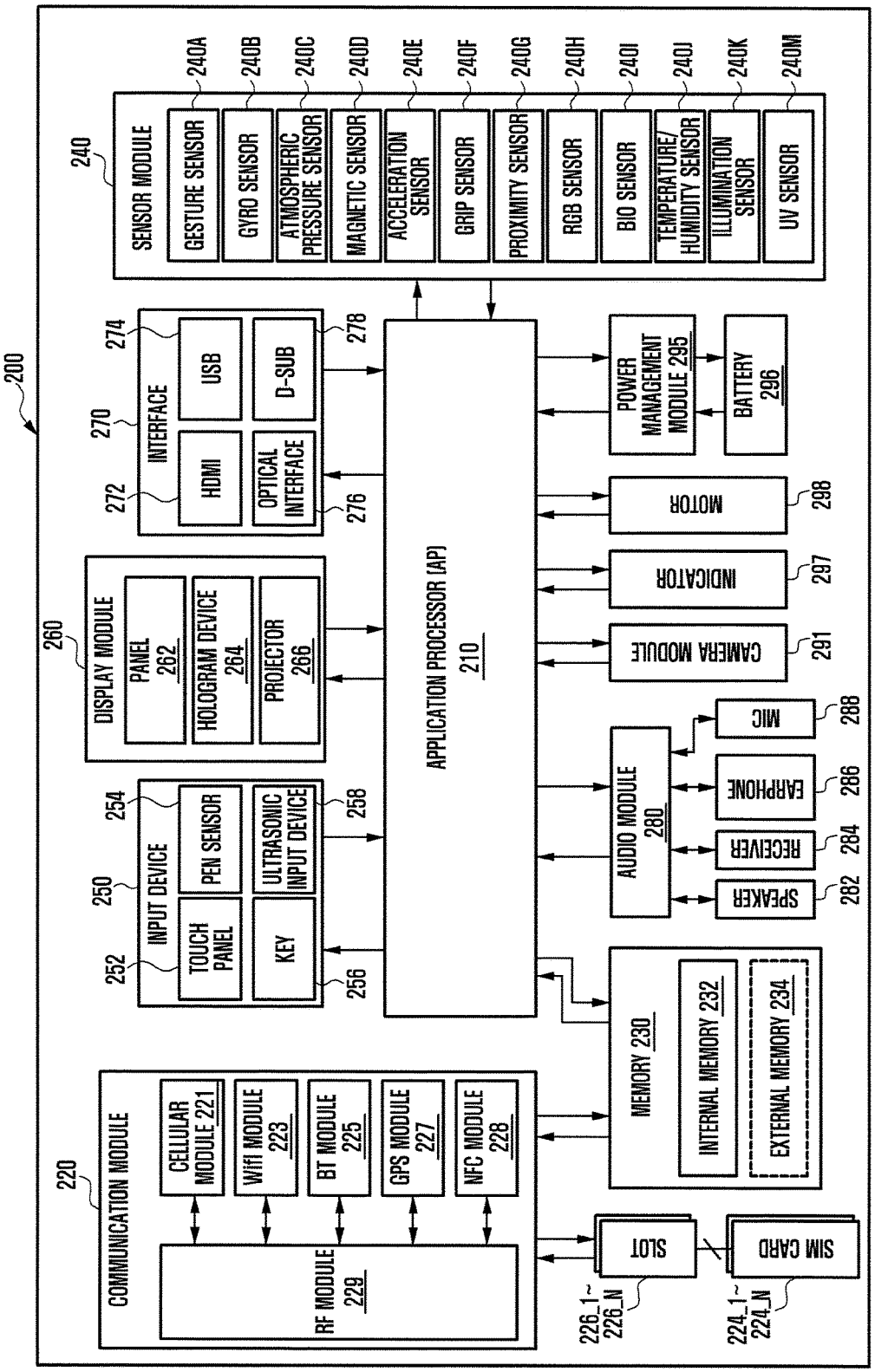
FIG. 2 illustrates an electronic device according to various embodiments of the present disclosure.

FIG. 2 is a block diagram 200 of an electronic device 201 according to various embodiments of the present disclosure. The electronic device 201 configures, for example, a whole or a part of the electronic device 101 illustrated in FIG. 1. Referring to FIG. 2, the electronic device 201 includes one or more of: Application Processors (APs) 210, a communication module 220, a Subscriber Identification Module (SIM) card 225, a memory 230, a sensor module 240, an input device 250, a display 260, an interface 270, an audio module 280, a camera module 291, a power managing module 295, a battery 296, an indicator 297, or a motor 298.

The AP 210 operates an operating system (OS) or an application program so as to control a plurality of hardware or software component elements connected to the AP 210 and execute various data processing and calculations including multimedia data. The AP 210 is implemented by, for example, a System on Chip (SoC). According to an embodiment, the processor 210 further includes a Graphic Processing Unit (GPU).

The communication module 220 (for example, communication interface 160) transmits/receives data in communication between different electronic devices (for example, the electronic device 104 and the server 106) connected to the electronic device 201 (for example, electronic device 101) through a network. According to an embodiment, the communication module 220 includes a cellular module 221, a WiFi module 223, a BLUETOOTH® (BT) module 225, a Global Positioning System (GPS) module 227, a Near Field Communication (NFC) module 228, and a Radio Frequency (RF) module 229.

The cellular module 221 provides a voice, a call, a video call, a Short Message Service (SMS), or an Internet service through a communication network (for example, Long Term Evolution (LTE), LTE-A, Code Division Multiple Access (CDMA), Wideband CDMA (WCDMA), UMTS, WiBro, GSM or the like). Further, the cellular module 221 distinguishes and authenticates electronic devices within a communication network by using a subscriber identification module (for example, the SIM card 224). According to an embodiment, the cellular module 221 performs at least some of the functions that can be provided by the AP 210. For example, the cellular module 221 can perform at least some of the multimedia control functions.

According to an embodiment, the cellular module 221 includes a Communication Processor (CP). Further, the cellular module 221 is implemented by, for example, an SoC.

Figure 8:
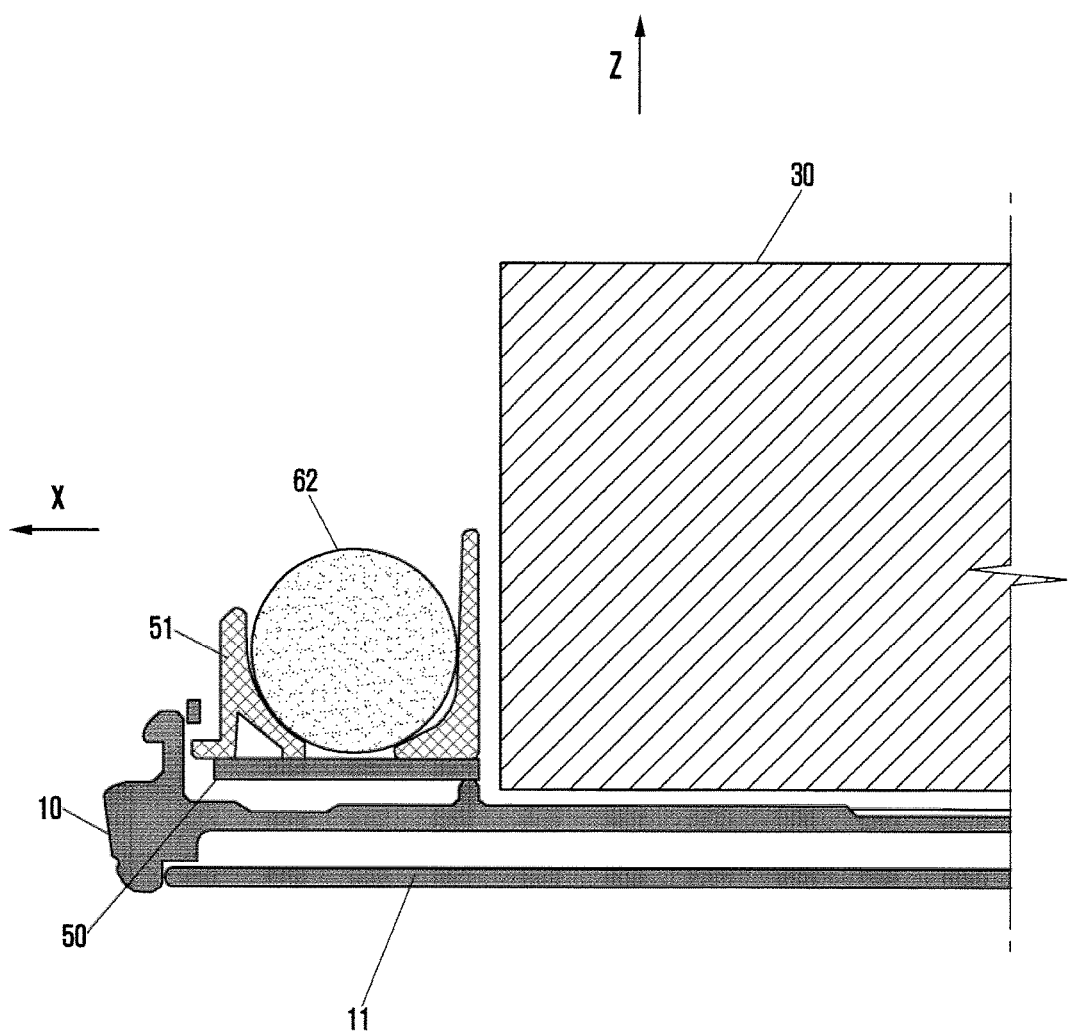
FIG. 8 illustrates a partial sectional view taken along line A-B in FIG. 7.

Although the components such as the cellular module 221 (for example, communication processor), the memory 230, and the power managing module 295 are illustrated as components separate from the AP 210 in FIG. 8, the AP 210 includes at least some (for example, cellular module 221) of the aforementioned components in an embodiment.

According to an embodiment, the AP 210 or the cellular module 221 (for example, communication processor) loads a command or data received from at least one of a volatile memory, a non-volatile memory. or other components connected to each of the AP 210 and the cellular module 221. The AP 210 or the cellular module 221 processes the loaded command or data. Further, the AP 210 or the cellular module 221 stores data received from at least one of other components or generated by at least one of other components in a non-volatile memory.

Each of the WiFi module 223, the BT module 225, the GPS module 227, and the NFC module 228 includes, for example, a processor for processing data transmitted or received through the corresponding module. Although the cellular module 221, the WiFi module 223, the BT module 225, the GPS module 227, and the NFC module 228 are illustrated as blocks separate from each other in FIG. 8, at least some (for example, two or more) of the cellular module 221, the WiFi module 223, the BT module 225, the GPS module 227, and the NFC module 228 can be included in one Integrated Chip (IC) or one IC package according to one embodiment. For example, at least some (for example, the communication processor corresponding to the cellular module 221 and the WiFi processor corresponding to the WiFi module 223) of the processors corresponding to the cellular module 221, the WiFi module 223, the BT module 225, the GPS module 227, and the NFC module 228 can be implemented by one SoC.

The RF module 229 transmits and receives data, for example, an RF signal. Although not illustrated, the RF module 229 includes, for example, a transceiver, a Power Amp Module (PAM), a frequency filter, a Low Noise Amplifier (LNA) or the like. Further, the RF module 229 further includes a component for transmitting and receiving electronic waves over a free air space in wireless communication, for example, a conductor, a conducting wire, or the like. Although the cellular module 221, the WiFi module 223, the BT module 225, the GPS module 227, and the NFC module 228 share one RF module 229 in FIG. 2, at least one of the cellular module 221, the WiFi module 223, the BT module 225, the GPS module 227, and the NFC module 228 may transmit/receive an RF signal through a separate RF module according to one embodiment.

The SIM card 225 is a card including a Subscriber Identification Module and can be inserted into a slot 226 formed in a particular portion of the electronic device. Additionally, a number of SIM cards 225_1-225_N can be inserted into respective slots 226_1-226_N. The SIM card 225 includes unique identification information (for example, Integrated Circuit Card IDentifier (ICCID)) or subscriber information (for example, International Mobile Subscriber Identity (IMSI)).

The memory 230 (for example, memory 130) includes an internal memory 232 or an external memory 234. The internal memory 232 includes, for example, at least one of a volatile memory (for example, a Random Access Memory (RAM), a dynamic RAM (DRAM), a static RAM (SRAM), a synchronous dynamic RAM (SDRAM), and the like), and a non-volatile Memory (for example, a Read Only Memory (ROM), a one time programmable ROM (OTPROM), a programmable ROM (PROM), an erasable and programmable ROM (EPROM), an electrically erasable and programmable ROM (EEPROM), a mask ROM, a flash ROM, a NAND flash memory, an NOR flash memory, and the like).

According to an embodiment, the internal memory 232 can be a Solid State Drive (SSD). The external memory 234 further includes a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 234 can be functionally connected to the electronic device 201 through various interfaces. According to an embodiment, the electronic device 201 further includes a storage device (or storage medium) such as a hard drive.

The sensor module 240 measures a physical quantity or detects an operation state of the electronic device 201, and converts the measured or detected information to an electronic signal. The sensor module 240 includes, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H (for example, Red, Green, and Blue (RGB) sensor) 240H, a biometric sensor 240I, a temperature/humidity sensor 240J, an illumination (light) sensor 240K, or a Ultra Violet (UV) sensor 240M. Additionally or alternatively, the sensor module 240 includes, for example, a E-nose sensor, an electromyography (EMG) sensor, an electroencephalogram (EEG) sensor, an electrocardiogram (ECG) sensor, an InfraRed (IR) sensor, an iris sensor, a fingerprint sensor (not illustrated), and the like. The sensor module 240 further includes a control circuit for controlling one or more sensors included in the sensor module 240.

The input device 250 includes a touch panel 252, a (digital) pen sensor 254, a key 256, and an ultrasonic input device 258. For example, the touch panel 252 recognizes a touch input in at least one type of a capacitive type, a resistive type, an infrared type, and an acoustic wave type. The touch panel 252 further includes a control circuit. In the capacitive type, the touch panel 252 can recognize proximity as well as a direct touch. The touch panel 252 further includes a tactile layer. In this event, the touch panel 252 provides a tactile reaction to the user.

The (digital) pen sensor 254 can be implemented, for example, using a method identical or similar to a method of receiving a touch input of the user, or using a separate recognition sheet. The key 256 includes, for example, a physical button, an optical key, or a key pad. The ultrasonic input device 258 is a device that can detect an acoustic wave by a microphone (for example, microphone 288) of the electronic device 201 through an input means generating an ultrasonic signal to identify data and can perform wireless recognition. According to an embodiment, the electronic device 201 receives a user input from an external device (for example, computer or server) connected to the electronic device 201 by using the communication module 220.

The display 260 (for example, display 150) includes a panel 262, a hologram device 264, and a projector 266. The panel 262 can be, for example, a Liquid Crystal Display (LCD) or an Active Matrix Organic Light Emitting Diode (AM-OLED). The panel 262 can be implemented to be, for example, flexible, transparent, or wearable. The panel 262 can be configured by the touch panel 252 and one module. The hologram device 264 shows a stereoscopic image in the air by using interference of light. The projector 266 projects light on a screen to display an image. For example, the screen can be located inside or outside the electronic device 201. According to an embodiment, the display 260 further includes a control circuit for controlling the panel 262, the hologram device 264, and the projector 266.

The interface 270 includes, for example, a High-Definition Multimedia Interface (HDMI) 272, a Universal Serial Bus (USB) 274, an optical interface 276, and a D-subminiature (D-sub) 278. The interface 270 can be included in, for example, the communication interface 160 illustrated in FIG. 1. Additionally or alternatively, the interface 290 includes, for example, a Mobile High-definition Link (MHL) interface, a Secure Digital (SD) card/Multi-Media Card (MMC), or an Infrared Data Association (IrDA) standard interface.

The audio module 280 bi-directionally converts a sound and an electronic signal. At least some components of the audio module 280 can be included in, for example, the input/output interface 140 illustrated in FIG. 1. The audio module 280 processes sound information input or output through, for example, a speaker 282, a receiver 284, an earphone 286, the microphone 288 or the like.

The camera module 291 is a device that can photograph a still image and a video. According to an embodiment, the camera module 291 includes one or more image sensors (for example, a front sensor or a back sensor), an Image Signal Processor (ISP) (not shown) or a flash (for example, an LED or xenon lamp).

The power managing module 295 manages power of the electronic device 201. Although not illustrated, the power managing module 295 includes, for example, a Power Management Integrated Circuit (PMIC), a charger Integrated Circuit (IC), or a battery or fuel gauge.

The PMIC can be mounted to, for example, an integrated circuit or a SoC semiconductor. A charging method can be divided into wired and wireless methods. The charger IC charges a battery and prevents over voltage or over current from flowing from a charger. According to an embodiment, the charger IC includes a charger IC for at least one of the wired charging method or the wireless charging method. The wireless charging method includes, for example, a magnetic resonance method, a magnetic induction method and an electromagnetic wave method, and additional circuits for wireless charging, for example, circuits such as a coil loop, a resonant circuit, a rectifier or the like can be added.

The battery fuel gauge measures, for example, a remaining quantity of the battery 296, or a voltage, a current, or a temperature during charging. The battery 296 stores or generates electricity and supplies power to the electronic device 201 by using the stored or generated electricity. The battery 296 includes a rechargeable battery or a solar battery.

The indicator 297 shows particular statuses of the electronic device 201 or a part (for example, AP 210) of the electronic device 201, for example, a booting status, a message status, a charging status and the like. The motor 298 converts an electrical signal to a mechanical vibration.

Although not illustrated, the electronic device 201 includes a processing unit (for example, GPU) for supporting a module TV. The processing unit for supporting the mobile TV processes, for example, media data according to a standard of Digital Multimedia Broadcasting (DMB), Digital Video Broadcasting (DVB), media flow or the like.

Each of the components of the electronic device according to various embodiments of the present disclosure can be implemented by one or more components and the name of the corresponding component may vary depending on a type of the electronic device. The electronic device according to various embodiments of the present disclosure includes at least one of the above described components, a few of the components may be omitted, or additional components can be further included. Also, some of the components of the electronic device according to various embodiments of the present disclosure can be combined to form a single entity, and thus may equivalently execute functions of the corresponding components before being combined.

Figure 3:
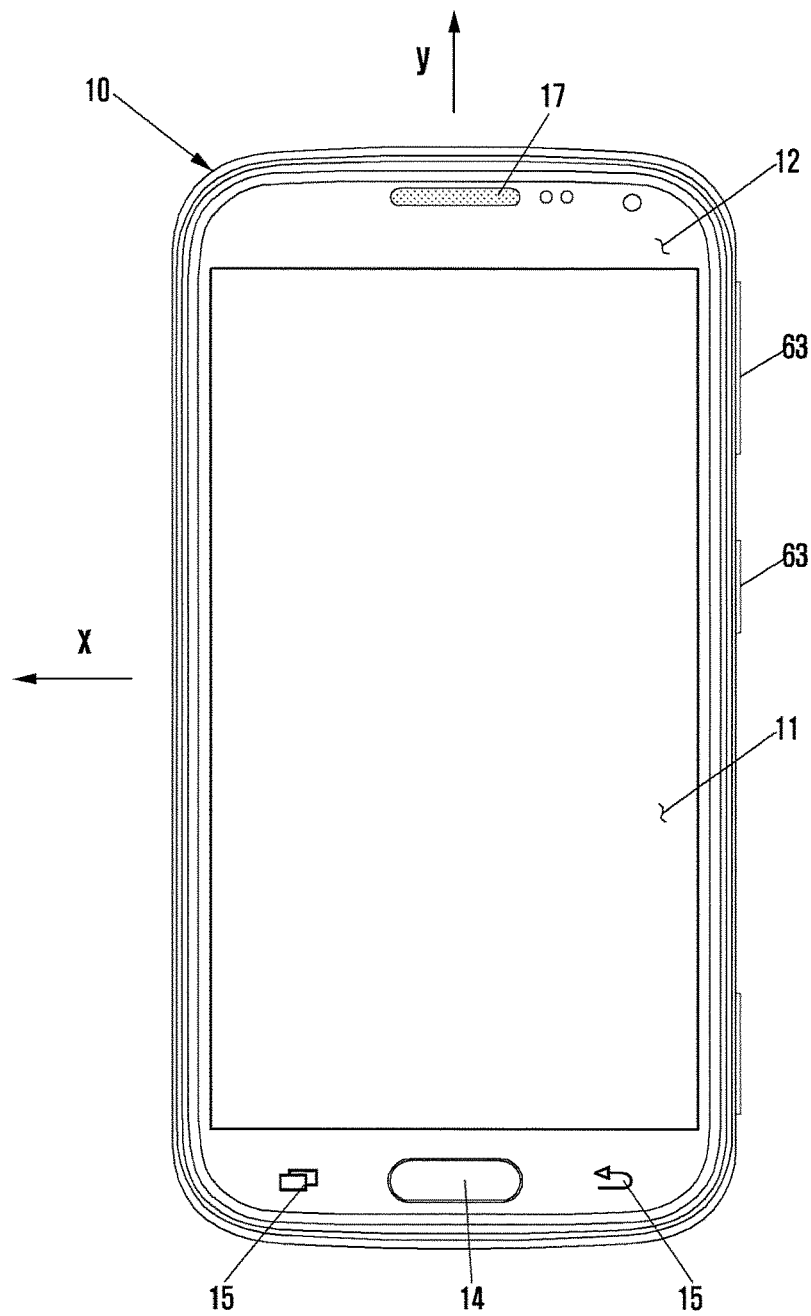
FIG. 3 illustrates a front surface of an electronic device according to one embodiment of the present disclosure.
Figure 4:
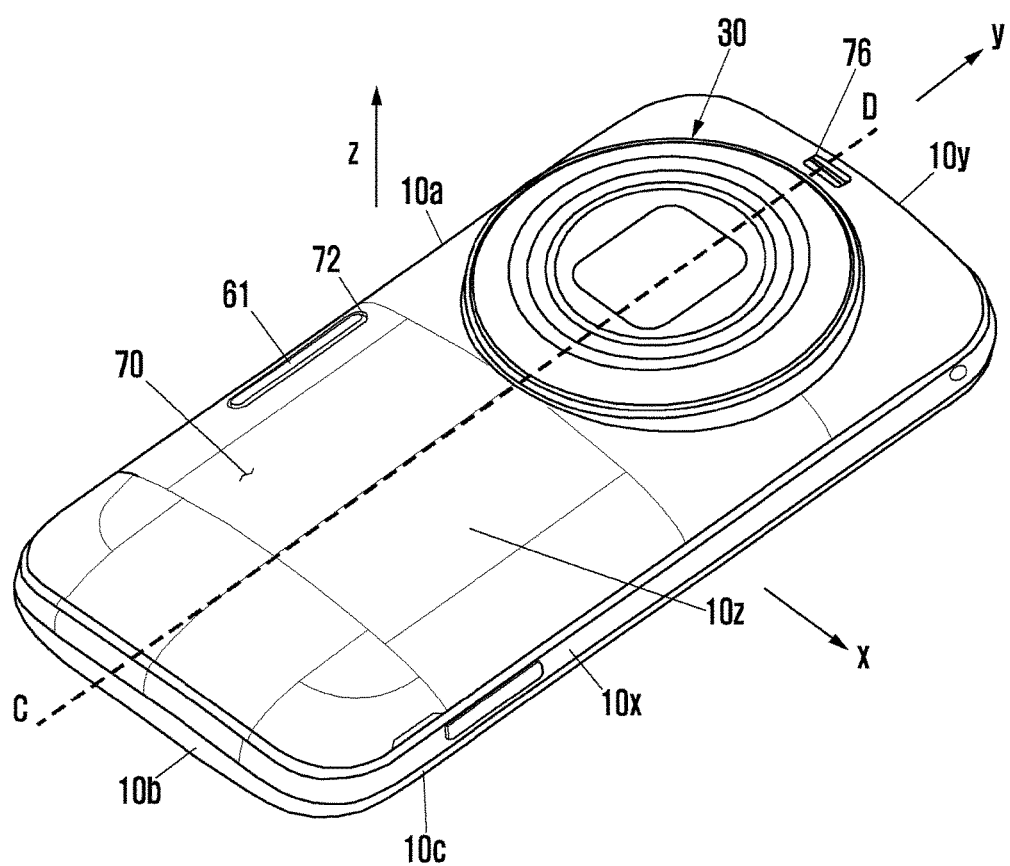
FIG. 4 illustrates a rear surface of the electronic device according to one embodiment of the present disclosure.
Figure 5:
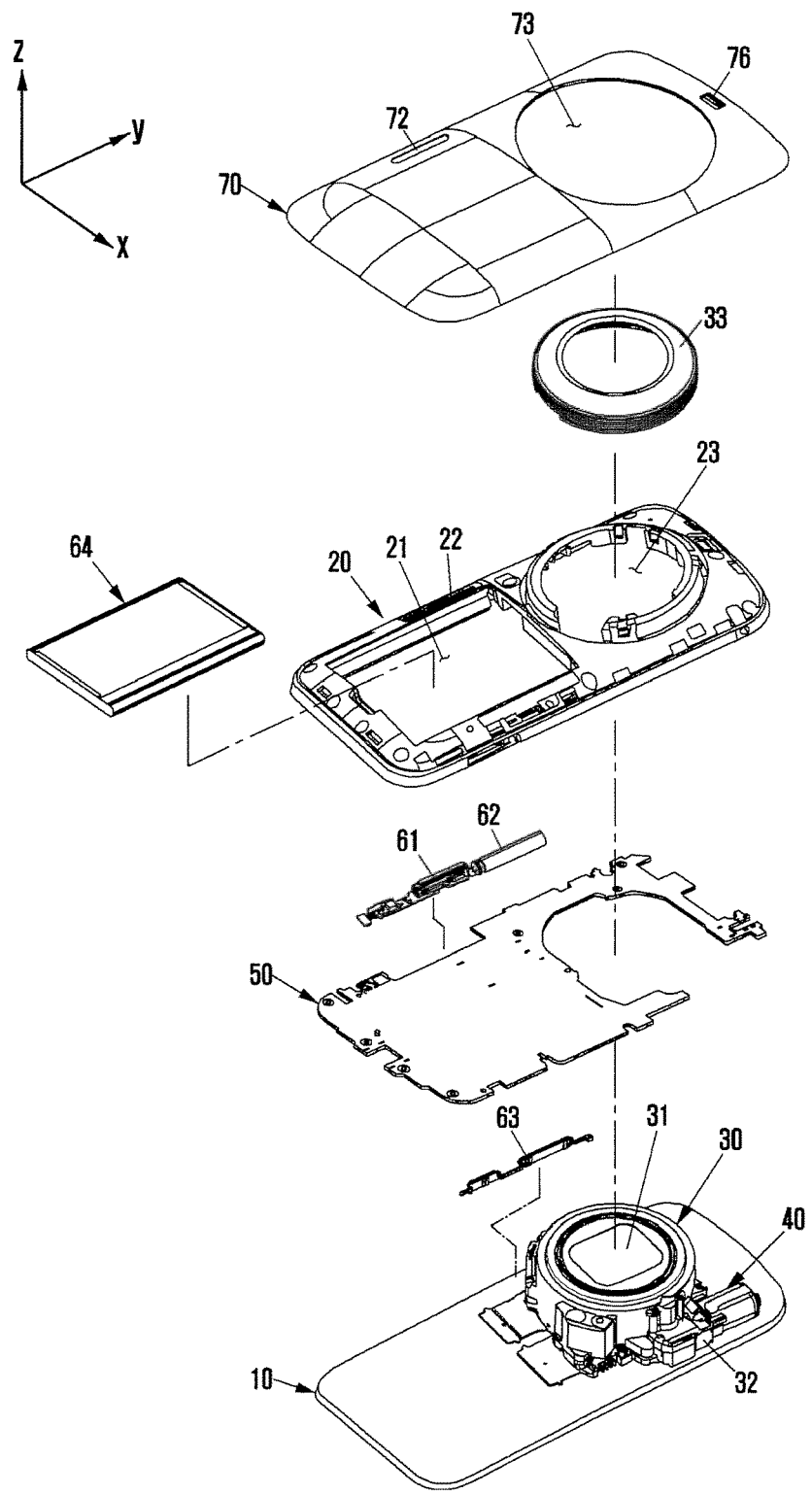
FIG. 5 illustrates an exploded perspective view of constituent elements of the electronic device according to one embodiment of the present disclosure in a disassembled state.

FIG. 3 is a view illustrating a front surface of an electronic device according to one embodiment of the present disclosure. FIG. 4 is a perspective view illustrating a rear surface of the electronic device according to one embodiment of the present disclosure. FIG. 5 is an exploded perspective view illustrating constituent elements of the electronic device according to one embodiment of the present disclosure in a disassembled state.

In the drawings accompanied to the present specification, a positive y axis direction on a y axis in FIG. 4 is defined as a top side direction, a negative y axis direction is defined as a bottom side direction, a positive x axis direction is defined as a first side direction, and a negative x axis direction is defined as a second side direction.

In addition, edges of the electronic device are defined as side surfaces. Four end parts formed on the side surfaces are defined as a first side end part 10x, a second side end part 10a, a top end part 10y, and a bottom end part 10b. That is, any one end of two ends 10x and 10a of the electronic device in the widthwise direction (x axis direction) is defined as a first side end part 10x, an end formed opposite to the first side end part 10x is defined as the second side end part 10a. Any one of two ends of the electronic device in the longitudinal direction (y axis direction) is defined as a top end part 10y, and the end formed opposite to the top end part 10y is defined as a bottom end part 10b.

In a plate-shaped configuration, a surface formed in the negative z axis direction is defined as a front surface, and a surface formed in the positive z axis direction is defined as a rear surface.

In addition, assuming that a surface is divided into two regions in a widthwise direction, a region closer to the first side end part 10x is defined as a first widthwise region, and a region closer to the second side end part 10a is defined as a second widthwise region. Similarly, a region closer to the top end part 10y is defined as a top side region, and a region closer to the bottom end part 10b is defined as a bottom side region.

An electronic device according to one embodiment of the present disclosure includes a camera function and a communication function.

The electronic device according to one embodiment of the present disclosure includes a front case 10, a rear case 20, a lens module 30, a motor unit 40, a main board 50, and a flash 61.

In the electronic device, a display unit 11 is exposed on the front surface, and the lens module 30 is disposed on the rear surface.

The front case 10 includes the display unit 11 on which a touch input can be performed. The front surface of the front case 10 can be divided into the display unit 11 and a bezel area 12. The display unit 11 is positioned on the front surface of the front case 10 in a state where a display module is accommodated in the electronic device. The display unit 11 is exposed on the front surface of the front case 10 to the outside of the electronic device.

The display unit 11 displays a screen implemented through the display module. The bezel area 12 provides an area where the display unit 11 is joined, more specifically, attached or adhered to the front case 10, and shuts off the exposure of the inside of the electronic device to the outside.

The bezel area 12 includes input keys. The input keys are generally positioned in the bezel area 12 in a type of a physical key 14 or a soft key 15.

The lens module 30 includes a lens 31, a lens driving unit 32 configured to enable zoom-in and zoom-out, and a lens deco 33 configured to protect the lens 31 and the lens module 30.

The lens module 30 has an optical zoom function. That is, the lens 31 can be zoomed in or zoomed out in a direction away from the rear surface of the front case 10. The length of the barrel of the lens module 30 can be lengthened or shortened.

The lens module 30 is installed on the rear surface (in the positive z axis direction) of the front case 10, and installed to photograph a subject positioned in front of the lens module 30. Accordingly, the user may photograph the subject positioned in front of the lens module 30 while watching the display unit 11.

The lens module 30 can be variously positioned on the rear surface of the front case 10. However, in order to arrange the battery 64 and the lens module 30 at proper positions, the rear surface of the front case 10 can be divided into two regions in the longitudinal direction, in which the lens module 30 can be positioned in a first longitudinal region and the battery 64 can be positioned in a second longitudinal region that is opposite to the first longitudinal region.

That is, in the top side region and the bottom side region of the front case 10, the lens module 30 can be positioned in the top side region (first longitudinal region), and the battery 64 can be positioned in the bottom side region (second longitudinal region).

Figure 6:
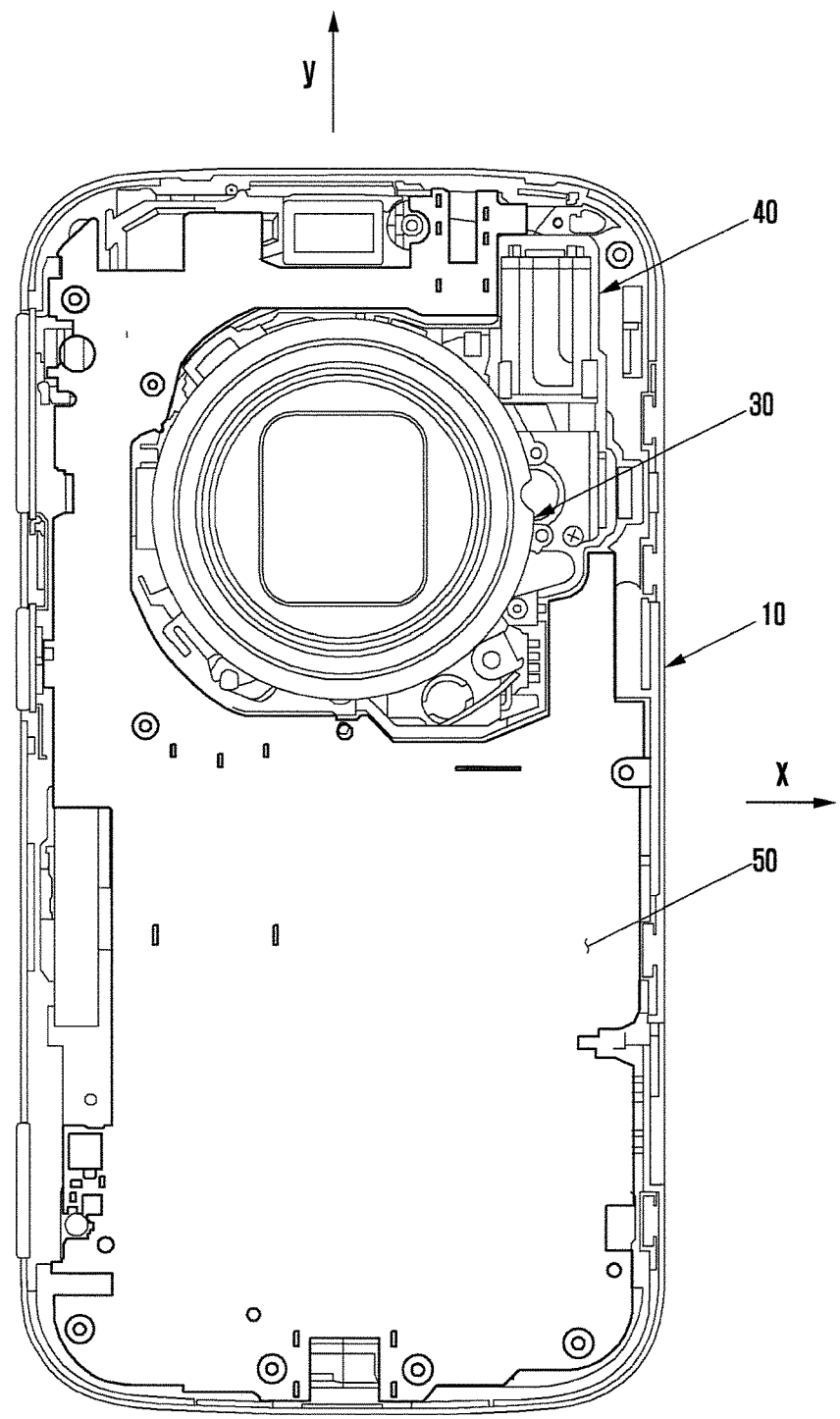
FIG. 6 illustrates an arranged state of a main board among internal constituent elements of the electronic device of the present disclosure.

FIG. 6 illustrates an arranged state of a main board 50 among the internal constituent elements of the electronic device according to one embodiment of the present disclosure.

Figure 7:
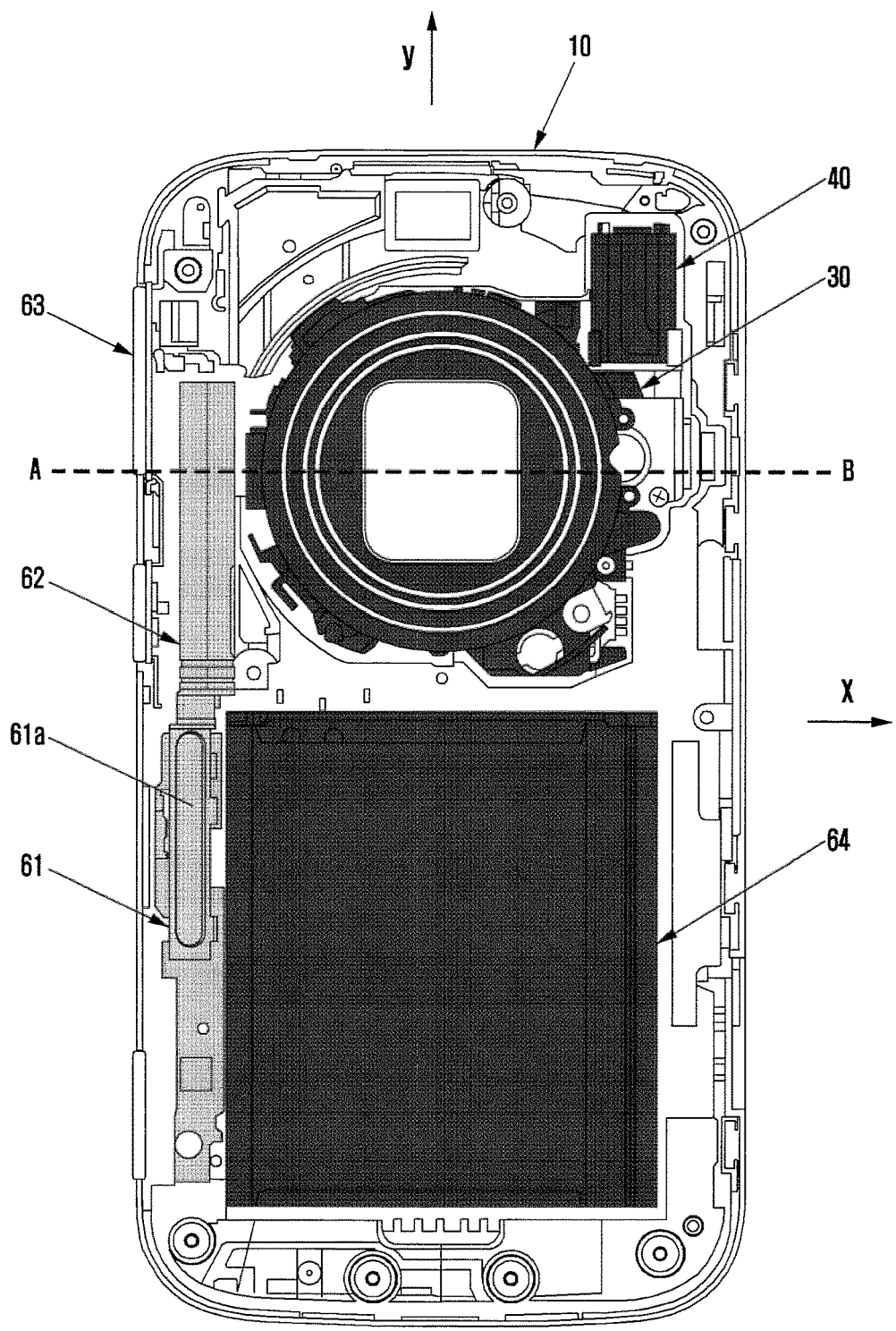
FIG. 7 illustrates constituent elements positioned on the top of the main board among the internal constituent elements of the electronic device according to one embodiment of the present disclosure.

FIG. 7 is a view illustrating constituent elements positioned on the top of the main board 50 among the internal constituent elements of the electronic device according to one embodiment of the present disclosure.

The motor unit 40 provides a driving force to the lens module 30. The motor unit 40 is installed in a region adjacent to the side end part opposite to a side key 63.

The side key 63 is positioned on any one of the widthwise side end parts of the electronic device so that the lens module 30 is positioned between the side key 63 and the motor unit 40.

For example, when the side key 63 is positioned in the first side end part 10x of the widthwise side end parts of the front case 10, the motor unit 40 is positioned in the second widthwise region closer to the second side end part 10a among the two widthwise regions that are divided in the widthwise direction of the front case 10. Of course, the side key 63 can be positioned in the second side end part 10a and the motor unit 40 can be positioned in the first widthwise region.

The motor unit 40 includes a motor body 40 and a driving shaft (not illustrated). The motor body 40 and the driving shaft extend in the longitudinal direction. Since the thickness of the electronic device is thin, the motor body 40 and the driving shaft are installed in a state in which they are laid on the rear surface of the front case 10.

The motor unit 40 is positioned in the first longitudinal region among the two longitudinal regions that are divided in the longitudinal direction of the electronic device, and the battery 64 is positioned in the second longitudinal region that is opposite to the first longitudinal region. That is, among the top end part 10y and the bottom end part 10b, the motor unit 40 are disposed adjacent to the top end part 10y, and the battery are disposed adjacent to the bottom end part 10b.

The motor unit 40 is positioned such that the lens driving unit 32 is positioned between the motor unit 40 and the battery 64.

The driving shaft of the motor unit 40 extends from the motor unit 40 to protrude in a direction approaching the lens module 30. The driving shaft transmits a driving force to a lens driving unit 32 provided at one side of the lens module 30. When the motor unit 40 is driven, the driving force is transmitted to the lens driving unit 32 by the driving shaft, and the lens module 30 performs zoom-in, zoom-out and focusing.

The main board 50 is positioned to be stacked on the rear surface of the front case 10. Although the lens module 30 and the motor unit 40 are installed on the main board 50, an area of the main board 50 is removed in order to avoid space constraint and the lens module 30 and the motor unit 40 are installed through the removed area.

The main board 50 is a printed circuit board, and, for example, various circuit devices, connectors and sockets are mounted on the main board 50. The main board 50 is electrically connected with the side key 63. In addition, the main board 50 can also be electrically connected with the lens module 30 and the motor unit 40 in order to control the lens module 30 and the motor unit 40.

When the motor unit 40 is positioned between the lens module 30 and the side key 63, the installation of the motor unit 40 is constrained due to the operation and size of the side key 63. Accordingly, it is proper to install the motor unit 40 in the region opposite to the side key 63.

In general, the camera includes a light emitting device in order to take a picture at night. According to one embodiment of the present disclosure, the electronic device includes a flash 61. The flash 61 is positioned on the rear surface of the front case 10. The flash 61 is positioned in the second widthwise region closer to the second side end part 10a in the widthwise direction, among the first and second side end parts 10x and 10a. The light emitting part 61a of the flash 61 is formed to extend in the longitudinal direction of the electronic device. The light emitting part 61a faces in the direction away from the rear surface of the front case 10. Accordingly, light is illuminated toward the rear surface of the electronic device by the light emitting part 61a.

The flash 61 is positioned to be stacked on the main board 50. In addition, the flash 61 can also penetrate the main board 50 like the lens module 30 and the motor unit 40.

The storage battery 62 is required for operating the flash 61. The storage battery 62 is a component required for applying a momentary voltage to the flash 61. Since the performance of the storage battery 62 is proportional to the size thereof, it is not practical to reduce the storage battery 62 excessively. Accordingly, the storage battery 62 is usually manufactured to correspond to an empty space inside the electronic device. However, the storage battery 62 is usually manufactured in a cylindrical shape for the purpose of efficient manufacturing. According to one embodiment of the present disclosure, the shape of the storage battery 62 also includes a cylindrical shape.

The storage battery 62 is electrically connected with the flash 61, and extends in the longitudinal direction of the electronic device in the second widthwise region bordered by the second side end part 10a among the first and second side end parts 10x and 10a which are opposite to each other in the widthwise direction. The storage battery 62 is provided to be positioned between the side key 63 and the lens module 30. Ends of the flash 61 and the storage battery 62 are connected to each other. The storage battery 62 is stacked on the main board 50. That is, the storage battery 62 is positioned on the rear surface of the main board 50 that is a region opposite to the front surface of the main board 50 where the main board 50 is in contact with the front case 10. When the storage battery 62 penetrates the main board 50, the side key 63 and the main board 50 are hardly connected with each other. That is, the storage battery 62 is stacked on the main board 50 such that main board 50 is not broken in the middle portion thereof.

FIG. 8 is a partial sectional view taken along line A-B in FIG. 7.

The storage battery 62 is fixed by a support 51, and stacked on the main board 50 to be connected with the main board 50. The rear case 20 is positioned above the main board 50 and assembled with the front case 10 to form the body of the electronic device.

The rear case 20 includes a lens through-hole 23, through which the lens module 30 is inserted to prevent separation of the lens module 30, a battery mounting part 21 positioned in the lower region, and a flash through-hole 22, through which the light emitting part 61a of the flash 61 is inserted.

The battery cover 70 is detachably coupled to the rear case 20 such that the battery cover 70 can be detached from and attached to the rear case 20 in a popup manner. The battery cover 70 includes a lens hole 73, through which the lens module 30 protrudes, and a flash hole 72, through which the light emitting part 61a of the flash 61 is exposed.

Figure 9:
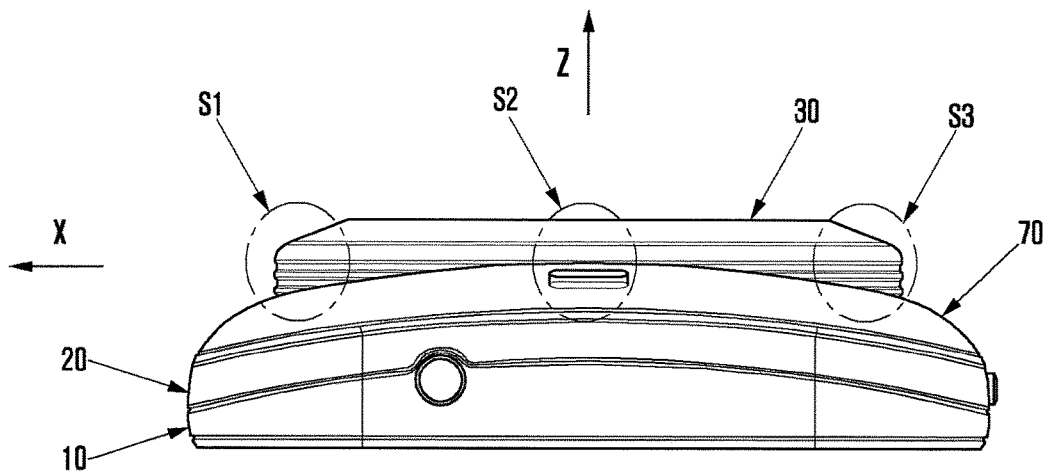
FIG. 9 illustrates a top end part of the electronic device according to one embodiment of the present disclosure.

FIG. 9 illustrates the top end part 10y of the electronic device according to one embodiment of the present disclosure.

Figure 10:
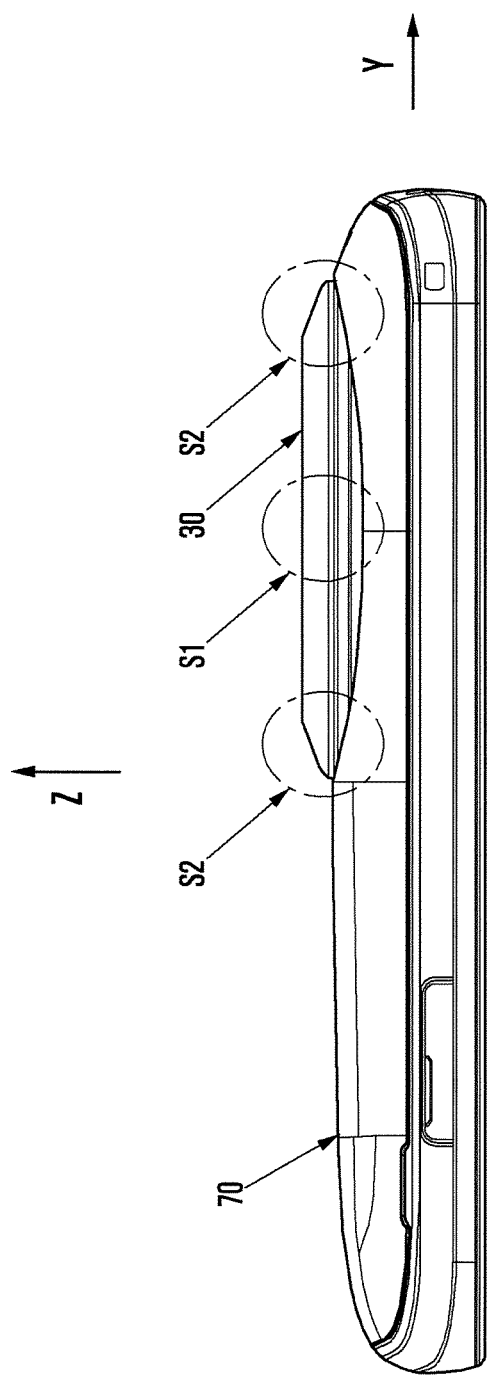
FIG. 10 illustrates a view illustrating a second side end part of the electronic device according to one embodiment of the present disclosure.

FIG. 10 illustrates a first side end part 10x of the electronic device according to one embodiment of the present disclosure.

In the outer surface of the battery cover 70, the central portion between the first side end part 10x and the second side end part 10a bulges out as compared to the first side end part 10x and the second side end part 10a. The thickness of the electronic device is thicker in the central portion than in the first and second side end parts. When the user grips the electronic device by a hand, the user's palm may naturally come in close contact with the outer surface of the battery cover 70. When the rear surface of the electronic device is flat, the user's palm does not come in close contact with the outer surface of the rear surface of the electronic device. Thus, the user may feel inconvenience while using the electronic device.

The outer surface of the battery cover 70 can have a continuously curved shape in the portion ranging from first side end part 10x to the second side end part 10a. That is, the outer surface of the battery cover 70 can have an arch shape in which the curvature radius at the central portion of the battery cover 70 is larger than the curvature radii at the first and second end parts. Steps S1 and S3 are formed by the lens module 30 and the battery cover 70, the step S2 at the central portion is minimum and the steps S1 and S3 at the portions facing the first and second side end parts 10x and 10a are maximum.

Figure 11:
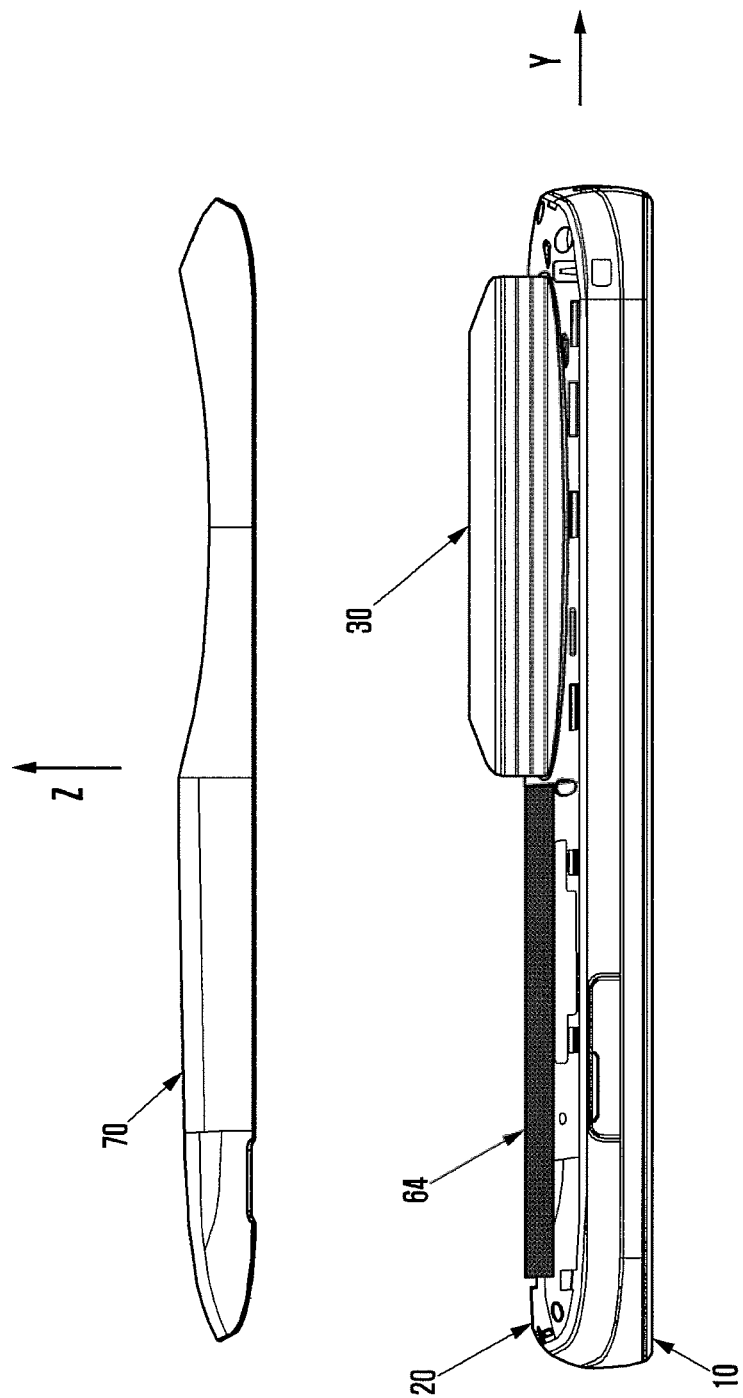
FIG. 11 illustrates a state where a battery cover is removed from the electronic device according to one embodiment of the present disclosure.

FIG. 11 illustrates a state in which the battery cover 70 is separated from the electronic device according to one embodiment of the present disclosure.

The battery cover 70 is disposed on the rear surface of the electronic device. The front case 10 and the rear case 20 are firmly assembled with each other. However, the battery cover 70 is detachably coupled to be easily detachable from or attachable to the electronic device according to the user's intention. When the battery cover 70 is easily detachable and attachable, the battery 64 positioned between the battery cover 70 and the rear case 20 can be easily replaced.

The battery cover 70 is attached to or detached from the rear case 20 in a popup manner. A conventional rear case usually has a flat outer surface without including a curved shape. When a zoom lens module is installed in the state where the outer surface of the rear case is flat, the lens module considerably protrudes from the rear case. When the zoom lens module excessively protrudes from the rear case, the lens through-hole is caught in the lens module when the battery cover is separated in the popup manner, and as a result, it is difficult to separate the battery cover from the electronic device. When the thickness of the terminal increases in order to reduce the protrusion amount of the lens module, the beauty of the electronic device may deteriorate although the relative protruding amount can be reduced, and the volume and weight of the electronic device may increase. According to various embodiments of the present disclosure, the central portion of the rear surface of the electronic device bulges out so that the battery cover can be easily removed from the electronic device, and the lateral parts can be formed to be thin as compared to the central portion. That is, when the central portion of the rear surface of the electronic device bulges out, the beauty of the external appearance of the electronic device can be improved.

Figure 12:
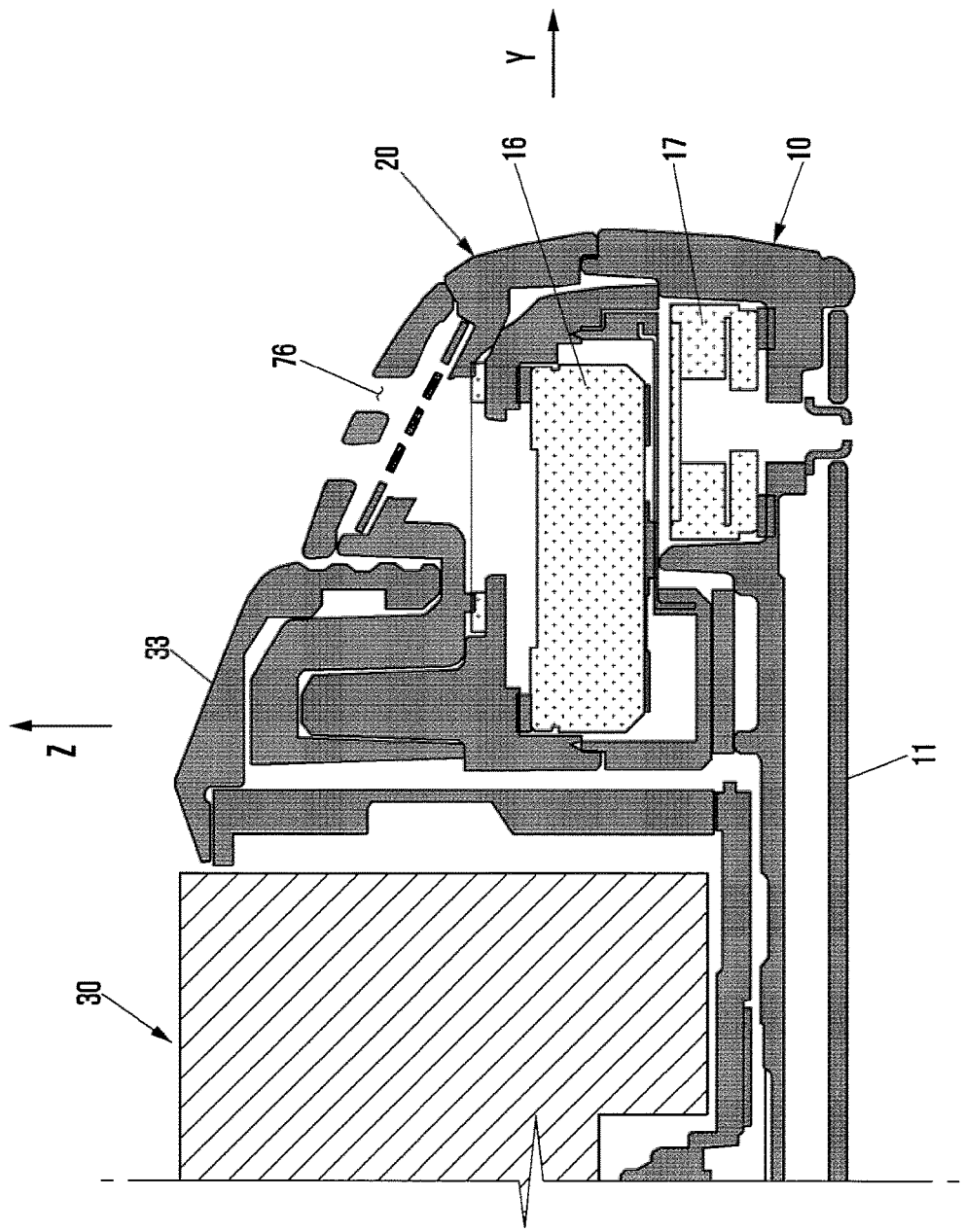
FIG. 12 illustrates a partial sectional view taken along line C-D in FIG. 4.

FIG. 12 illustrates a partial sectional view taken along line C-D in FIG. 4.

Referring to FIGS. 2 and 12, a speaker 16 is positioned in the top end side direction of the lens module 30 (in the positive y-axis direction). That is, the speaker 16 is disposed between the top end part 10y and the lens module 30. The battery cover 70 includes speaker hole 76 at a position corresponding to the speaker 16.

A phone receiver 17 can be positioned between the speaker 16 and front surface 10c of the front case 10. In the past, it was difficult to dispose a speaker and a receiver to be stacked one on another in the thickness direction of the electronic device (in the Z-axis direction) due to the sizes thereof. When the central portion of the electronic shape is formed in the curved shape, a component mounting space (in the Z-axis direction) is secured in the inside of the central portion of the electronic device. Within the secured mounting space, the receiver 17 and the speaker 16 can be mounted to be stacked one on another in the thickness direction of the electronic device (in the Z-axis direction). As a result, since the speaker 16 and the receiver 17 can be disposed to be stacked one on another unlike those disposed side by side in the prior art, the entire length of the electronic device (the length in the Y-axis direction) can be minimized.

Figure 13:
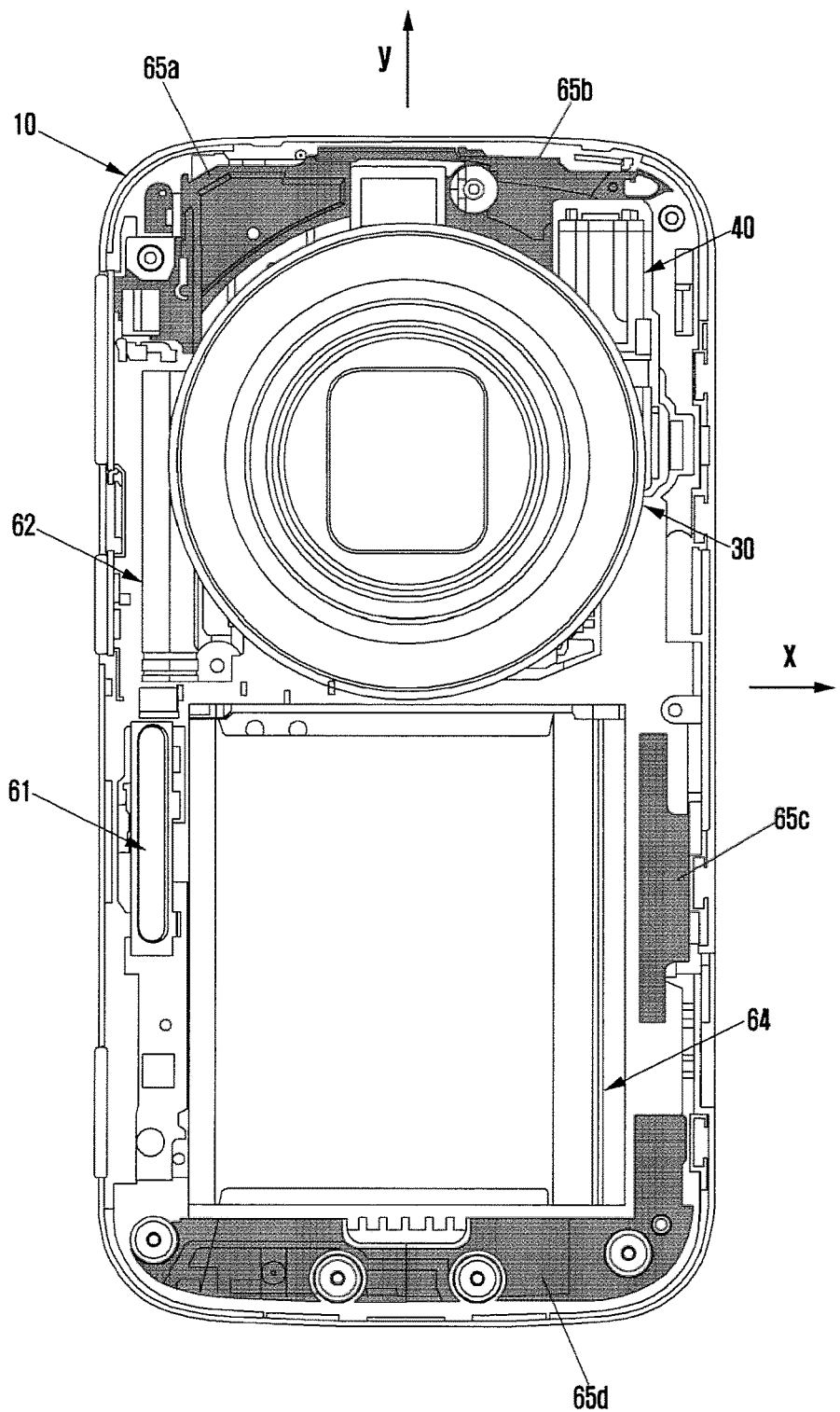
FIG. 13 illustrates a state where a battery case is removed from the electronic device according to one embodiment of the present disclosure.

FIG. 13 illustrates a state in which the battery case 70 is removed from the electronic device according to one embodiment of the present disclosure.

Various antennas can be positioned to be spaced apart from a metallic body in a space other than the space where the lens module 30, the motor unit 40, the flash 61, the storage battery 62, and the battery 64 are positioned. A GPS antenna 65a and an LTE antenna 65b can be installed in the top end part 10y, or in the first side end part 10x. A main antenna 65d can be installed in the bottom end part 10b.

By a mounting structure of the lens module 30, the motor unit 40, the storage battery 62, the flash 61, the battery 64, and the main board 50 equipped in the electronic device of the present disclosure, the battery cover 70 according to one embodiment of the present disclosure may not include a grip protruding to the outside. Accordingly, the user may easily perform a touch input operation on display unit 11 while the user grips the electronic device. That is, in a state where the user grips the electronic device by one hand, the user can perform an input operation on a side key 63 by the hand, and can touch the display unit 11 by the other hand, even if the electronic device includes an optical zoom lens.

In one embodiment of the present disclosure, a zoon level refers to a size grade of a screen output by the display unit 11. For example, the display unit 11 of the electronic device may display a screen having an optional size, that is, a screen of an optional zoom level. Descriptions will be made below on a case where a zoom-out input is received at this time. The zoom level of the screen displayed by the display unit 11 after the zoom-out input is received is lower than the zoom level of the screen displayed before the zoom-out input is received. In other words, the zoom-out causes the screen displayed by the display unit 11 to be contracted according to a predetermined magnification. In contrast, the zoom level of the screen displayed by the display unit after the zoom-in input is received is higher than the zoom level of the screen displayed before the zoom-in input is received. In other words, the zoom-in causes the screen displayed by the display unit 11 to be enlarged according to the predetermined magnification. At this time, an enlargement or contraction magnification between the respective zoon levels can be determined by a manufacturer's or user's selection.

Herein below, a process of driving the zoom of a lens module by a zoom level adjusting method of the electronic device according to one embodiment of the present disclosure.

Figure 14:
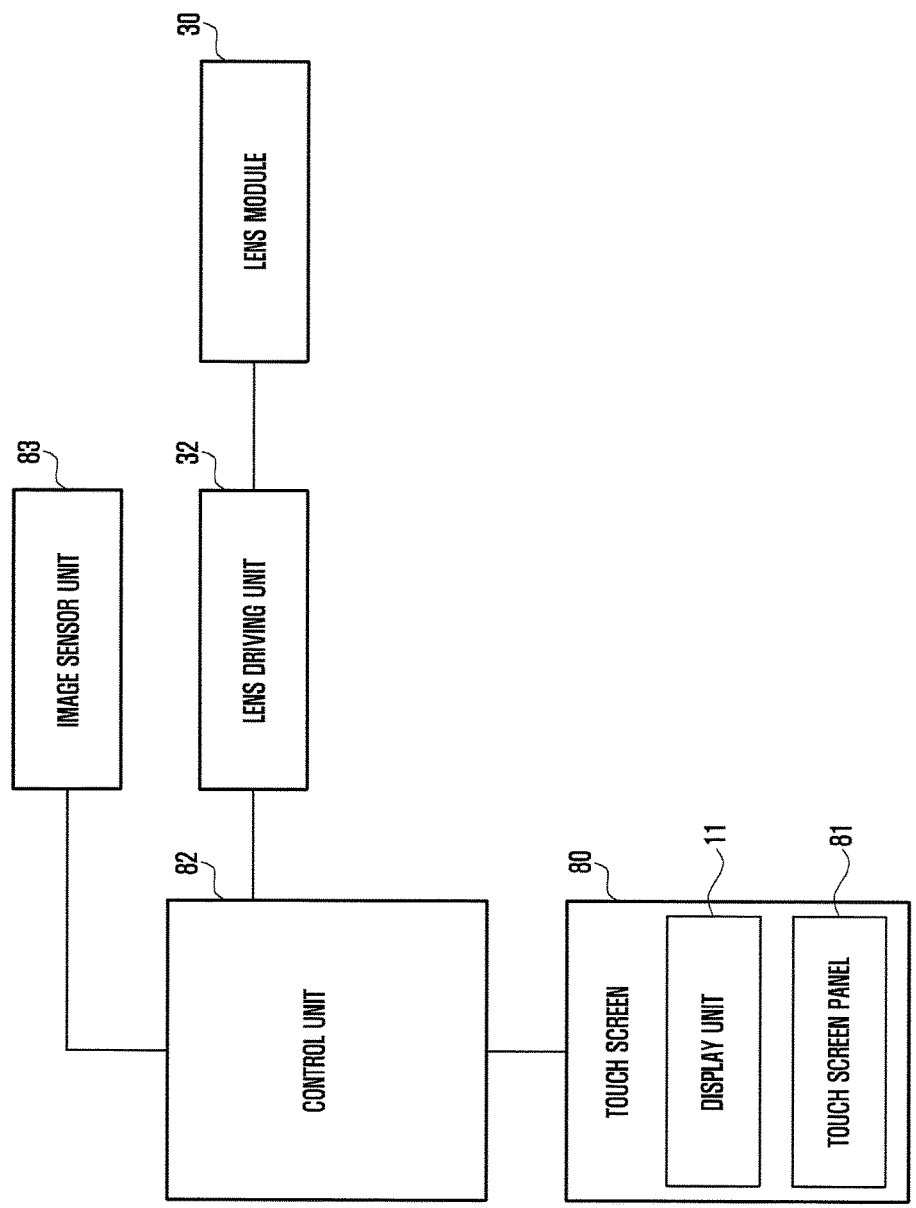
FIG. 14 illustrates a configuration of the electronic device according to one embodiment of the present disclosure.

FIG. 14 illustrates a configuration of the electronic device according to one embodiment of the present disclosure.

Referring to FIG. 14, according to one embodiment of the present disclosure, an electronic device includes a control unit 82, a touch screen 80, an image sensor unit 83, a lens module 30, and a lens driving unit 32.

The image sensor unit 83 receives light entering the lens module 30 and converts the light into an image signal.

The touch screen 80 is a component that provides various screen interfaces required for operating the electronic device. The touch screen 80 includes a touch screen panel 81 and a display unit 11. In addition, the touch screen panel 81 can be formed to have a size equal to or larger than the entire screen of the display unit 11 to be operated in a full touch screen form with reference to the display unit 11.

The touch screen 80 displays, for example, a standby screen and a menu screen which are required for operating the electronic device, various application execution screens configured to allow the user to perform various works through the terminal, an image, and a moving picture, through the display unit 11.

The touch screen panel 81 is mounted on the front surface of the touch screen 80. The touch screen 81 is configured to generate a touch event in response to the user's gesture on the touch screen 80 and to transmit the touch event to the control unit 82. Thus, the control unit 82 is configured to sense the user's touch gesture from the touch event input through the touch screen panel 81, and to control the components described above in response to the sensed touch gesture. Meanwhile, the touch screen panel 81 can be, for example, a resistive type, a capacitive type, an electromagnetic induction type, or a pressure type.

After the touch panel receives a zoom-in input or a zoom-out input from the user, the control unit 82 continuously senses the zoom-in or zoom-out input for at least a predetermined length of time. Upon sensing such input continuously, the control unit 82 controls the display unit 11 to output a screen having a specific zoom level.

According to one embodiment of the present disclosure, the control unit 82 controls, for example, signal transmission and processing, and power supply and distribution which are required in executing a zoom level adjusting method of a terminal. In addition, the control unit 82 is configured to sense various touch gesture inputs received by the touch screen panel 81 so as to perform the zoom level adjusting method on the screen displayed on the display unit 11 of the electronic device. The control unit 82 senses the type of the touch gesture input, and determines whether the touch gesture input corresponds to any one of a zoom-in command and a zoom-out command. In addition, the control unit 82 determines whether the touch gesture corresponding to the determined zoom-in or zoom-out command is sensed in succession for a pre-set length of time. When it is determined that the touch gesture is continued for the pre-set length of time, the control unit 82 changes the zoom level to a pre-set specific level.

The electronic device receives a finger touch input from the user and executes a corresponding function. In particular, the user may zoom in or zoom out the size of the screen output on the front surface of the display unit 11 of the electronic device using the touch input method. For such size adjustment of the screen, a double tap input or a pinch-in/out input is generally used.

The double-tap input is to apply the finger touch input to the display unit 11 of the electronic device twice in succession so that the touch panel senses the action. By the double tap input, the electronic device may display a corresponding output screen in a size enlarged or contracted in a predetermined scale. In addition, the pinch-in/out input is to pinch two points on the display unit 11 by fingers and perform a pinch-in or pinch-out action to narrow or widen the distance between the two points while maintaining the finger touch input so that the touch panel senses the action. The size of the screen output by the electronic device can also be contracted or enlarged to a desired size by the pinch-in/out input.

That is, the double tap input or the pinch-in/out input causes zoom-in and zoom-out to be executed on the screen output by the display unit of the terminal. The pinch-in/out input adjusts the size of the screen depending on the distance between two points touched by the fingers.

According to one embodiment of the present disclosure, the electronic device drives the zoom of the lens module 30 through the pinch-out and pinch-in. Hereinafter, descriptions will be made on a process of driving the zoom of the lens module 30 by the pinch-in and pinch-out.

Figure 15:
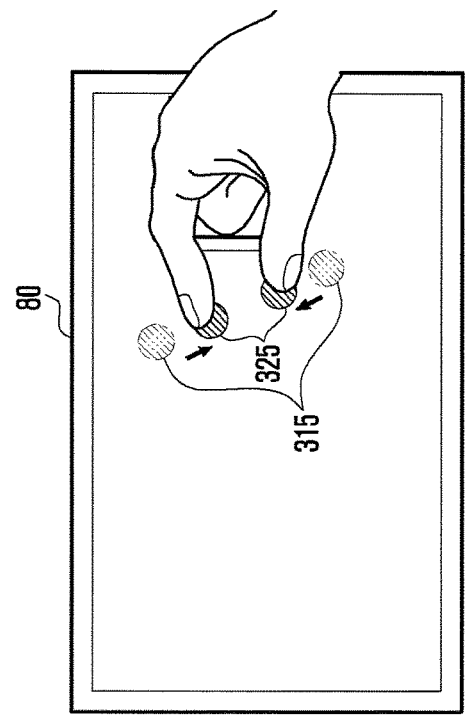
FIG. 15 illustrates a pinch-in input method of the electronic device according to one embodiment of the present disclosure.
Figure 15:
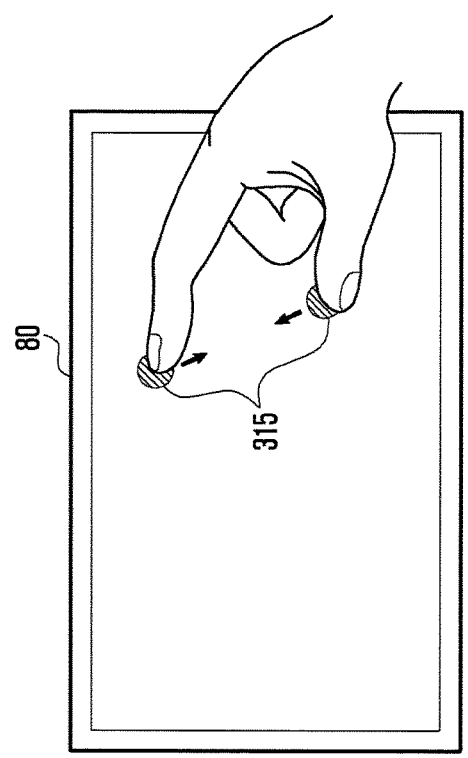

FIG. 15 illustrates a pinch-in input method of the electronic device according to one embodiment of the present disclosure.

Referring to FIG. 15, the left and right figures are views for describing how the electronic device receives a pinch-in input through the touch screen 80 of the electronic device according to one embodiment of the present disclosure.

In the left figure of FIG. 15, the touch screen 80 receives a touch input 315 at two points of the touch screen 80 from the user. The control unit 82 receives a signal indicating that the touch input 315 is received at the two points, from the touch screen 80. When the distance of the touch input 315 on the two points is narrowed, the control unit 82 determines the input as a pinch-in input.

Next, descriptions will be made on the state where the distance of the touch input 315 on the first two points is narrowed to the touch input 325 on second two points in the right figure. While the distance of the two points is narrowed, the finger touch state is maintained on the touch screen 80. Since this is a pinch-in input as described above, in an ordinary case, the lens module 30 is zoomed out by an extent corresponding to the distance change between the two points.

That is, the pinch-in input is recognized due to the finger touch, the control unit 82 moves the lens driving unit 32 to an extent corresponding to the change of the distance between the two points which is recognized through the pinch-in input, which can cause the lens module 30 to be zoomed out.

When pinch-in is input, the lens module 30 can be zoomed out, and a live view displayed on the display unit 11 may also be zoomed out. When pinch-out is input, the lens module 30 can be zoomed in, and the live view displayed on the display unit 11 may also be zoomed in.

According to one embodiment of the present disclosure, when the touch input is released after the pinch-in input is completed as illustrated in the right figure, that is, the distance of the touch input 325 on the two point is narrowed, the control unit 82 recognizes this as a new command. That is, the control unit 82 senses a touch release event and performs a control such that a new operation is performed. While the electronic device photographs a video through the lens module 30 and the image sensor unit 83, the zoom magnification of the lens module 30 can be controlled through the pinch-in and pinch-out.

Figure 16:
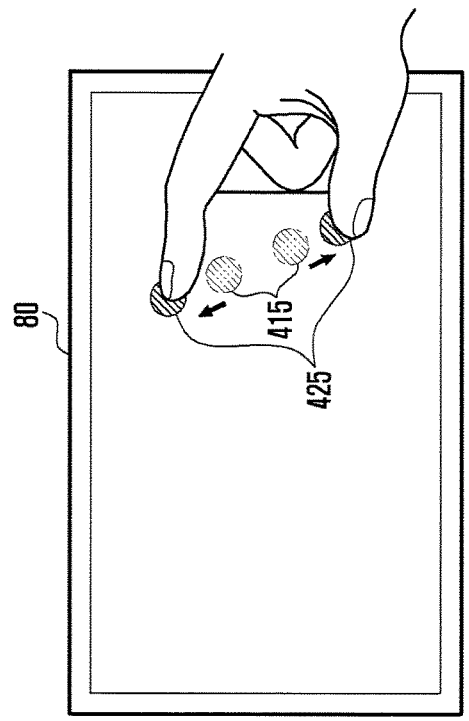
FIG. 16 illustrates a pinch-out input method of the electronic device according to one embodiment of the present disclosure.
Figure 16:
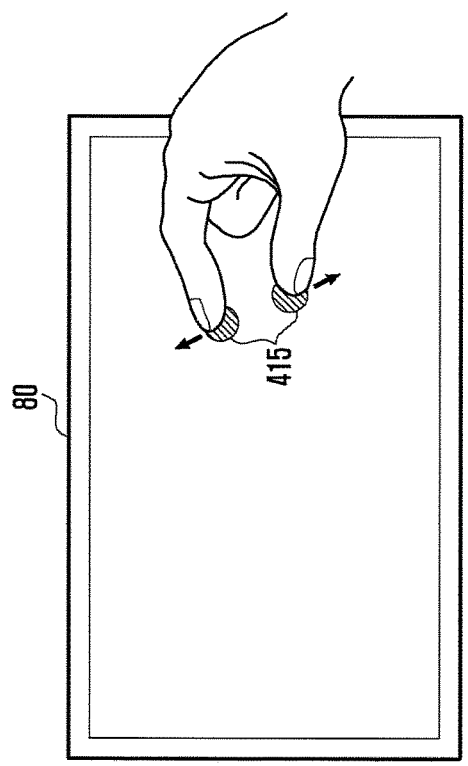

FIG. 16 illustrates a pinch-out input method of the electronic device according to one embodiment of the present disclosure.

Referring to FIG. 16, the left and right figures of FIG. 16 are views for describing how the electronic device receives a pinch-out input through the touch screen 80 of the electronic device according to one embodiment of the present disclosure.

In the left figure of FIG. 16, the touch screen 80 receives a touch input 415 at two points of the touch screen 80 from the user. The control unit 82 receives a signal indicating that the touch input 415 is received at the two points, from the touch screen 80. When the distance of the touch input 415 on the two points is widened, the control unit 82 determines the input as a pinch-out input.

Next, descriptions will be made on the state where the distance of the touch input 415 on the first two points is widened to the touch input 425 on second two points in the right figure. While the distance of the two points is widened, the finger touch state is maintained on the touch screen 80. Since this is a pinch-out input as described above, in an ordinary case, the lens module 30 is zoomed in by an extent corresponding to the distance change between the two points. That is, the pinch-out input is recognized by the finger touch, the control unit 82 moves the lens driving unit 32 to an extent corresponding to the change of the distance between the two points that is recognized through the pinch-out input, which can cause the lens module 30 to be zoomed in. In addition, a live view displayed on the display unit 11 also can be zoomed in.

When pinch-out is input, the lens module 30 can be zoomed in, and a live view displayed on the display unit 11 also can be zoomed in. When pinch-in is input, the lens module 30 can be zoomed out, and the live view displayed on the display unit 11 also can be zoomed out.

According to one embodiment of the present disclosure, when the touch input is released after the pinch-in input is completed as illustrated in the right figure, that is, the distance of the touch input 425 on the two point is widened, the control unit 82 recognizes this as a new command. That is, the control unit 82 senses a touch release event and performs a control such that a new operation is performed.

Figure 17:
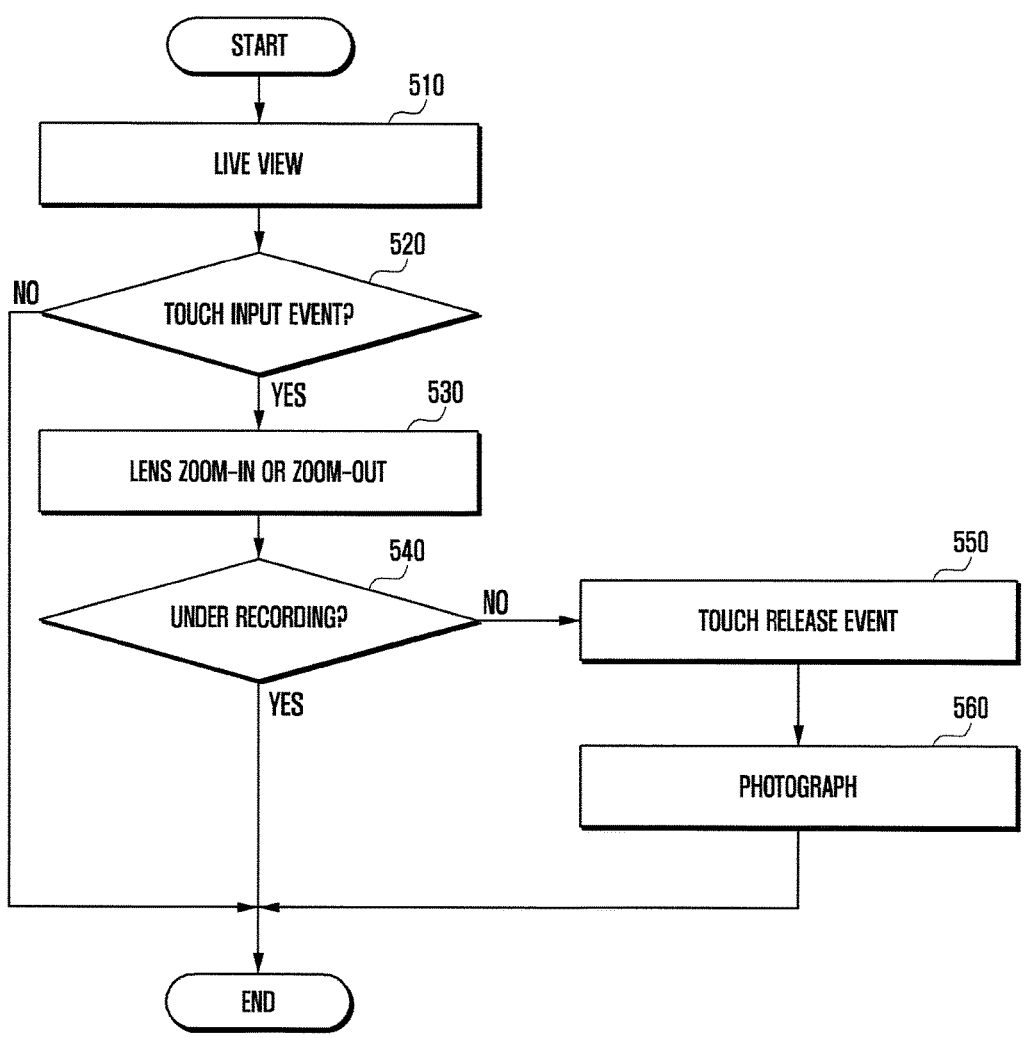
FIG. 17 illustrates a method for adjusting zoom of a lens module of the electronic device according to one embodiment of the present disclosure.

FIG. 17 illustrates a method for adjusting the zoom of the lens module 30 of the electronic device according to one embodiment of the present disclosure.

In step 510, the control unit 82 controls the display unit 11 to display an image generated by the image sensor unit 83 as a live view.

In step 520, the control unit 82 senses a touch input event. That is, the control unit 82 receives and senses a touch input through the touch screen panel 81, and determines whether the touch input corresponds to any one of a zoom-in input and a zoom-out input. For example, the control unit 82 determines whether a pinch-in input or a pinch-out input is received. When it is determined that a pinch-in input is received, the control unit 82 senses a zoom-out input, and when it is determined that a pinch-out input is received, the control unit 82 senses a zoom-in input.

In step 530, the control unit 82 performs a control such that the zoom of the lens module 30 is driven. When there is the pinch-in input, the control unit 82 performs a control such that the lens module 30 is zoomed out. At this time, the screen displayed on the display unit 11 as a live view is also zoomed out. When there is the pinch-out input, the control unit 82 performs a control such that the lens module 30 is zoomed in. At this time, the screen displayed on the display unit 11 as a live view is also zoomed out.

In step 540, the control unit 82 determines whether the electronic device is in a recording mode or in a picture photographing mode. That is, the control unit 82 determines whether the electronic device is under video recording.

Step 550 is performed when the electronic device is in the picture photographing mode in step 540. The control unit 82 recognizes the touch release event.

When the touch release event input is received, the control unit 82 stores a signal input from the image sensor unit 83 in step 560. That is, the picture photographing is performed by the touch release event.

When the electronic device is in the video recording mode in step 540, the control unit 82 does not store a still image even if the touch release event is input. That is, in the video recording mode, a recorded screen is zoomed in or zoomed out through the pinch-in and pinch-out.

Figure 18:
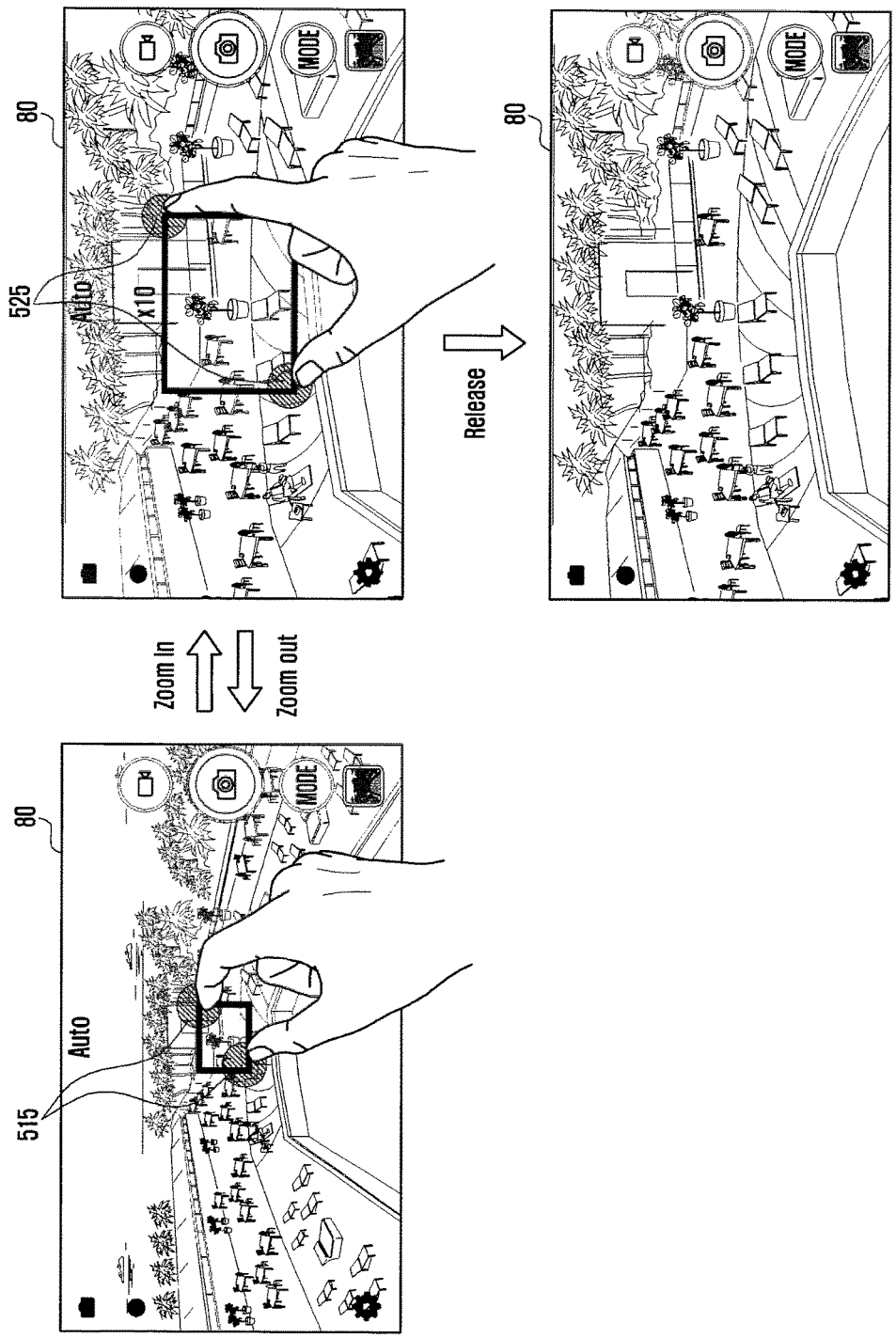
FIG. 18 illustrates an operation in a picture photographing mode of the electronic device according to one embodiment of the present disclosure.

FIG. 18 illustrates an operation of the electronic device according to one embodiment of the present disclosure in the picture photographing mode.

When the pinch-out is input, the lens module 30 is zoomed in, and the display unit 11 display a live view zoomed in by the lens module 30. When the touch release event is input, a zoomed-in screen is photographed. Of course, an image, which is zoomed out as compared to an initial screen to which the touch release event is input after the pinch-in input, is photographed.

Figure 19:
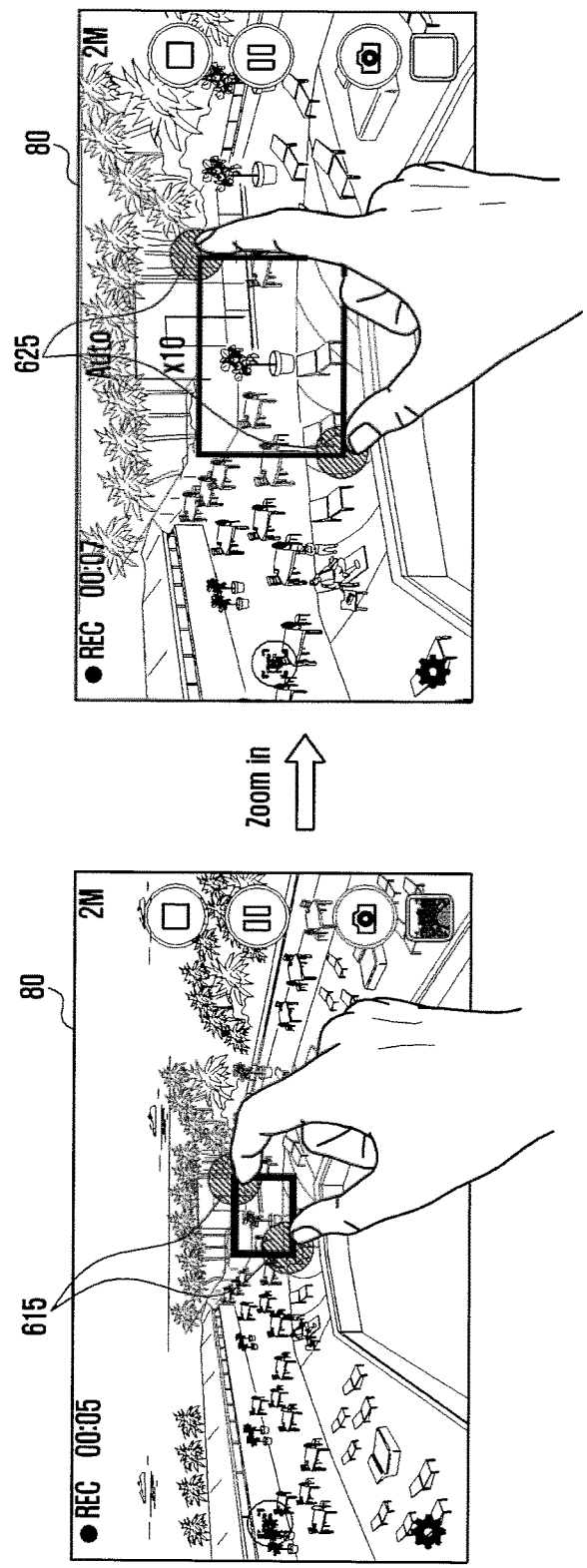
FIG. 19 illustrates an operation in a video photographing mode of the electronic device according to one embodiment of the present disclosure.

FIG. 19 illustrates an operation of the electronic device according to one embodiment of the present disclosure in the video photographing mode.

A pinch-in or pinch-out input also can be made while a video is being recorded. When there is a pinch-in or pinch-out input, the control unit 82 performs zoom-in or zoom-out of the recorded screen. While the video is recorded, it is proper that picture photographing is not performed by the touch release event.

The term "module" used in the various embodiments of the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the various embodiments of the present disclosure includes at least one of an Application-Specific Integrated Circuit (ASIC) chip, a Field-Programmable Gate Arrays (FPGA), and a programmable-logic device for performing operations which have been known or are to be developed hereinafter.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic communication device comprising:
a front case divided into two widthwise regions;
a rear case coupled to the front case inside the electronic communication device;
a display unit disposed on a front surface of the front case;
a lens module disposed on a rear surface of the front case opposite of the display unit, and disposed between a side key and a motor unit;
the motor unit disposed on the rear surface of the front case at a first side of the lens module, the motor unit configured to provide a driving force to the lens module, wherein the motor unit is positioned in a first widthwise region of the two widthwise regions of the front case, and wherein the first widthwise region is a region bordered by a first side end part of the front case;
the side key positioned at a second side of the lens module, the second side of the lens module opposite to the first side of the lens module, and the side key is positioned on a second side end part of the front case that is opposite to the first side end part of the front case;
a speaker positioned between a top end part of the front case and the lens module;
a communication module comprising:
circuitry configured to communicate data via a wireless telecommunications medium, and
a phone receiver positioned between the speaker and the front surface of the front case; and
a battery cover that has a continuously curved shape in a region ranging from the first side end part of the front case to the second side end part of the front case and is attachable to and completely detachable from the rear case, the battery cover comprising:
a lens hole, through which the lens module protrudes beyond an exterior of the battery cover;
a flash hole in which a light emitting part of a flash is positioned; and
a speaker hole at a position corresponding to the speaker, and
wherein, when the battery cover is completely detached from the rear case, a battery port is provided in which a battery can be installed in and uninstalled from the electronic communication device.

2. The electronic communication device of claim 1, wherein the lens module includes a zoom lens, and the lens module is positioned in a first longitudinal region of the front case.

3. The electronic communication device of claim 2, wherein a driving shaft of the motor unit extends from the motor unit in a direction approaching the lens module in a longitudinal direction of the front case, and wherein the driving shaft is configured to transmit the driving force to a lens driving unit positioned at one of the first or second side of the lens module.

4. The electronic communication device of claim 2, further comprising:
a main board coupled to the rear surface of the front case, wherein the lens module and the motor unit are installed to penetrate the main board.

5. The electronic communication device of claim 4, wherein the main board comprises a printed circuit board electrically connected to the side key, the lens module, and the motor unit.

6. The electronic communication device of claim 5, wherein the flash is disposed on a rear surface of the front case,
wherein the flash is disposed on a second widthwise region of the front case, the second widthwise region bordered by the second side end part, the second widthwise region disposed opposite the first widthwise region, and wherein the light emitting part of the flash is formed to extend in a longitudinal direction of the electronic communication device to face a direction away from a rear surface of the electronic communication device.

7. The electronic communication device of claim 6, further comprising:
the battery is disposed in a second longitudinal region of the front case,
wherein the battery is disposed between the side key and the lens module and operable to be connected to the flash.

8. The electronic communication device of claim 7, wherein the battery is positioned on a rear surface of the main board, the rear surface of the main board is opposite to a front surface of the main board and the front surface of the main board is in contact with the rear surface of the front case, and
wherein the battery is electrically connected to the main board.

9. The electronic communication device of claim 8, wherein the rear case is disposed such that the main board is positioned between the front case and the rear case, the rear case further including:
a battery mounting part positioned in a lower region of the rear case; and
wherein the battery mounting part is positioned in the second longitudinal region.

10. The electronic communication device of claim 9, wherein the battery cover is detachable from or attachable to the rear case in a popup manner.

11. The electronic communication device of claim 10, wherein the battery cover has a central portion, the central portion of the battery cover positioned between the first side end part of the front case and the second side end part of the front case, wherein a thickness of the electronic device at the central portion is thicker than at the first and second side end parts of the front case, and
wherein a step is formed between the lens module and the battery cover.

12. The electronic communication device of claim 1, further comprising:
a touch screen panel configured to sense a zoom-in or zoom-out input at one or more points; and
a control unit configured to determine whether the touch screen panel senses the zoom-in or zoom-out input in succession for a pre-set length of time at the one or more points, wherein zoom of the lens module is driven in response to the zoom-in or zoom-out input.

13. The electronic communication device of claim 12, wherein the display unit is configured to display a live view generated by an image sensor unit.

14. The electronic communication device of claim 13, wherein, when in a picture photographing mode, when a touch release event is sensed after the zoom-in or zoom-out input is sensed, the electronic communication device photographs a still image.

15. The electronic communication device of claim 14, wherein the zoom-in or zoom-out input and the zoom of the lens module are proportional to each other within a pre-set range.

16. The electronic communication device of claim 1, wherein the electronic communications device comprises one or more of: a smart phone, a tablet Personal Computer (PC), a mobile phone, a video phone, an e-book reader, a desktop PC, a laptop PC, a netbook computer, a Personal Digital Assistant (PDA), or a wearable device, and wherein the wearable device comprises one or more of: a Head-Mounted-Device (HMD), electronic glasses, electronic clothes, and electronic bracelet, an electronic necklace, an electronic accessory, an electronic tattoo, or a smart watch.

* * * * *